United States Patent
Hultgren et al.

(10) Patent No.: US 12,053,336 B2
(45) Date of Patent: *Aug. 6, 2024

(54) DIGITAL DENTURE DESIGN AND REPLACEMENT

(71) Applicant: VOYAGER DENTAL, INC., Eden Prairie, MN (US)

(72) Inventors: Bruce Willard Hultgren, Victoria, MN (US); John Michael Madden, Minneapolis, MN (US); Michael C. Marshall, Edina, MN (US); Stephen B. Siegfried Floe, Chanhassen, MN (US)

(73) Assignee: Voyager Dental, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/546,195

(22) PCT Filed: Feb. 14, 2022

(86) PCT No.: PCT/US2022/016362
§ 371 (c)(1),
(2) Date: Aug. 11, 2023

(87) PCT Pub. No.: WO2022/174165
PCT Pub. Date: Aug. 18, 2022

(65) Prior Publication Data
US 2024/0033061 A1    Feb. 1, 2024

Related U.S. Application Data

(60) Provisional application No. 63/149,178, filed on Feb. 12, 2021, provisional application No. 63/274,798, filed on Nov. 2, 2021.

(51) Int. Cl.
*A61C 13/00* (2006.01)
*G06T 19/20* (2011.01)

(52) U.S. Cl.
CPC .......... *A61C 13/0004* (2013.01); *G06T 19/20* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

2008/0248443 A1* 10/2008 Chishti .................. G06T 17/00
   433/24
2008/0286712 A1* 11/2008 Imgrund .................. A61C 7/00
   433/24

(Continued)

OTHER PUBLICATIONS

International Search Report and Written Opinion in International Application No. PCT/US2022/016362 mailed Jun. 7, 2022, 11 pages.

*Primary Examiner* — Martin Mushambo
(74) *Attorney, Agent, or Firm* — Barnes & Thornburg LLP

(57) ABSTRACT

Apparatuses, components, devices, methods, and systems for generating dentures are provided. An example system includes a motion capture system that captures patient jaw motion and generates patient jaw motion data; and a denture design system that generates a denture design based on the patient jaw motion data. An example method includes acquiring a digital reference denture model of a reference denture; selecting a denture tooth library based on the digital reference denture model; selecting and aligning denture library teeth from the selected denture tooth library to the digital reference denture model; generating a denture base digital model based on the digital reference denture model and the aligned denture library teeth; and fabricating a physical denture based from the denture base digital model.

20 Claims, 23 Drawing Sheets

(56) References Cited

U.S. PATENT DOCUMENTS

| | | | |
|---|---|---|---|
| 2011/0020770 A1* | 1/2011 | Adusumilli | A61C 19/00 433/214 |
| 2011/0207072 A1* | 8/2011 | Schiemann | A61C 7/146 700/98 |
| 2012/0015316 A1* | 1/2012 | Sachdeva | G16H 40/20 382/128 |
| 2014/0294273 A1* | 10/2014 | Jaisson | A61C 7/00 382/131 |
| 2015/0118640 A1* | 4/2015 | Schmitt | A61C 9/0006 433/69 |
| 2015/0374460 A1 | 12/2015 | Sachdeva et al. | |
| 2016/0008108 A1 | 1/2016 | Thompson et al. | |
| 2018/0098829 A1 | 4/2018 | Fisker et al. | |
| 2019/0362033 A1 | 11/2019 | Presswood et al. | |

\* cited by examiner

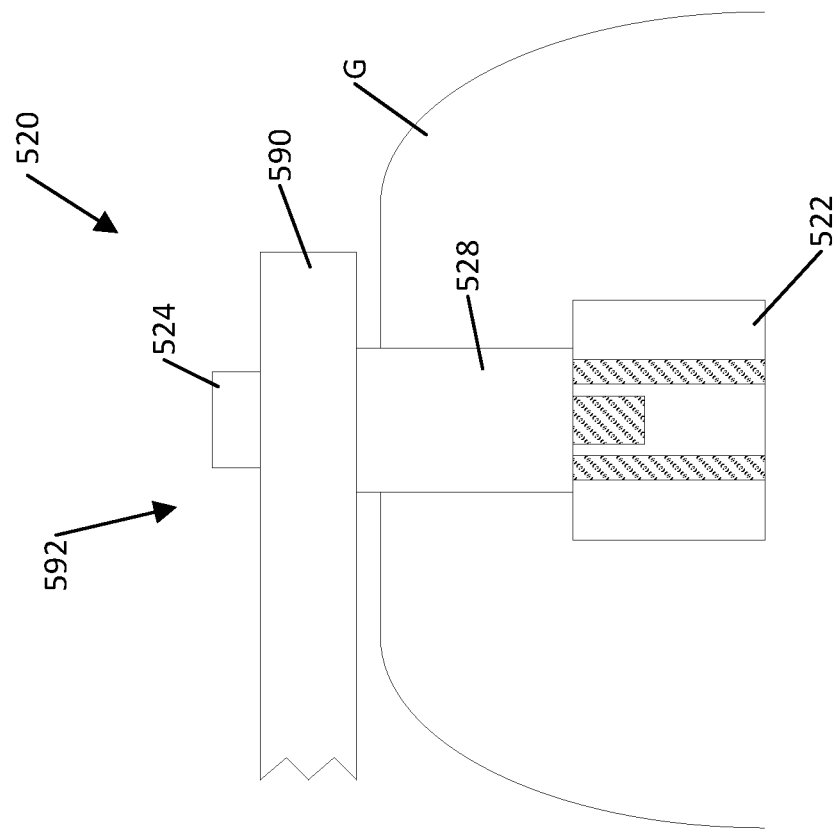
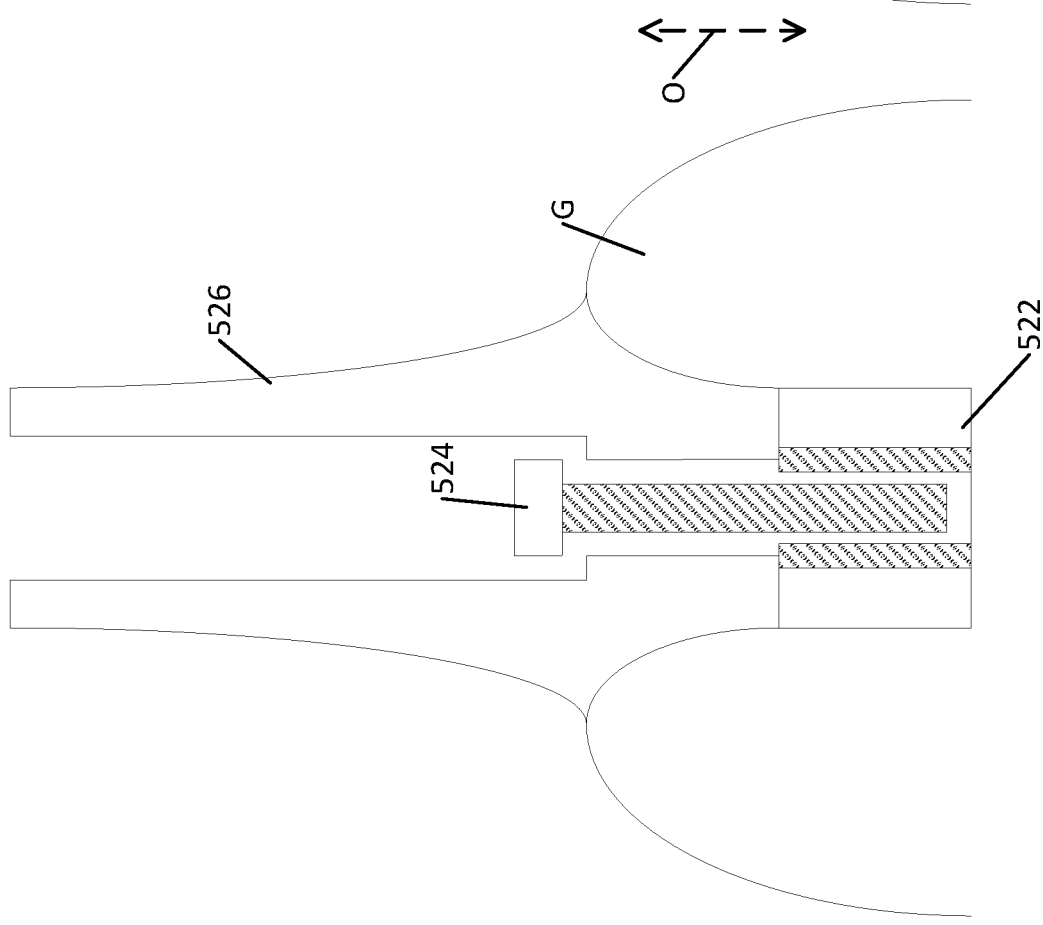
FIG. 5B
FIG. 5A ated with a denture base. Denture teeth formed from acrylic or other materials may be secured to the denture base.

DIGITAL DENTURE DESIGN AND REPLACEMENT

CROSS REFERENCE TO RELATED APPLICATIONS

This application is a U.S. National Stage Application of International Application No. PCT/US2022/016362, filed Feb. 14, 2022, which claims priority, as appropriate, to U.S. Ser. No. 63/149,178, titled "MOTION-BASED DIGITAL DENTURE DESIGN" and filed Feb. 12, 2021, and U.S. Ser. No. 63/274,798, titled "DIGITAL DENTURE DESIGN AND REPLACEMENT" and filed Nov. 2, 2021, the disclosures of which are hereby incorporated by reference in their entireties.

BACKGROUND

A denture is a dental prosthesis that is made to replace missing teeth. Dentures are often supported by the surrounding soft and hard tissue of the oral cavity. For example, a denture may be designed to fit over and be supported by a patient's gum tissue. Dentures may include a denture base region that is formed from an acrylic material and colored to appear similar to gum tissue. Denture teeth formed from acrylic or other materials may be secured to the denture base.

There are a variety of types of dentures. For example, dentures may be fixed or removable, and implant-supported or non-implant supported. Additionally, dentures may be complete (i.e., replacing the teeth of an entire dental arch) or partial (i.e., replacing less than all of the teeth of a dental arch).

A removable denture is made such that a patient may (and usually should) remove the denture during ordinary use. For example, the patient may remove the denture on a daily basis for overnight cleaning. Non-implant supported, removable dentures are often held in place by a suction fit between the bottom of the denture and the patient's gum tissue. The bases of removable dentures are generally fabricated to closely follow the shape of the patient's gum tissue. When the base is pressed against the patient's gum tissue, air may be forced out, creating a low-pressure suction seal between the denture base and the patient's tissue. Partial removable dentures may include clasps that mechanically secure the denture to the patient's remaining teeth.

Implant-supported dentures are designed to couple to dental implants that have been implanted in the patient. Implant-supported dentures may be fixed or removable. Some implant-supported dentures may be removable by the patient to allow for cleaning.

A fixed denture is not intended to be removed by a patient during ordinary use. Typically, a fixed denture is placed by a care provider, such as a dentist or prosthodontist, and is removed, if necessary, by the care provider. A fixed denture may, for example, be secured to one or more dental implants.

When properly made and fit, dentures may provide numerous benefits to the patient. These benefits include improved mastication (chewing) as the denture replaces edentulous (gum tissue) regions with denture teeth. Additional benefits include improved aesthetics when the patient's mouth is open due to the presence of denture teeth and when the patient's is closed due to the cheek and lip support provided by the denture structure. Another benefit of dentures is improved pronunciation as the presence of properly sized front teeth is important for making several speech sounds.

Understanding and recording an accurate static relationship between teeth in a patient's upper jaw and lower jaw is an important first step in the art and science of designing dentures. Existing techniques and systems for making dentures may fail to adequately size and shape dentures for the dynamic movements of a patient's jaw.

SUMMARY

In general terms, this disclosure is directed to motion-based dentures and motion-based denture design systems and methods. In one possible configuration and by non-limiting example, patient motion data is captured using a patient assembly that is coupled to a patient's dentition and the captured motion data is used by a denture design system to design a motion-based denture.

One aspect is a method comprising: acquiring a digital model of a patient's dentition; acquiring motion data for the patient; determining a vertical dimension of occlusion for the patient; positioning the digital model based on the motion data to achieve the desired vertical dimension; and generating a denture design based on the positioned digital model.

Another aspect is a method comprising: acquiring a digital model of a patient's dentition; positioning a first set of digital denture teeth models with respect to the digital model, the first set of digital denture teeth being for a first dental arch; positioning a second set of digital denture teeth models with respect to the digital model, the second set of digital denture teeth being for a second dental arch; generating a user interface that displays at least some of the first set of digital denture teeth and some of the second set of digital denture teeth; and receiving a user input; responsive to the user input: repositioning at least one tooth from the second set of digital denture teeth in a direction indicated by the user input; further repositioning the at least one tooth from the second set of digital denture teeth to make contact with the first set of digital denture teeth; and updating the display of the of the at least one tooth from the second set of digital denture teeth.

Yet another aspect is a system comprising: a motion capture system that captures patient jaw motion and generates patient jaw motion data; and a denture design system including at least one processor and at least one memory that is operably coupled to the at least one processor and storing instructions that, when executed by the at least one processor, cause the denture design system to generate a denture design based on the patient jaw motion data by: generating an occlusal guidance surface based on the patient jaw motion data; and positioning digital denture library teeth based on the occlusal guidance surface.

Another aspect is a method comprising: acquiring a digital reference denture model of a reference denture for a patient; selecting a denture tooth library based on the digital reference denture model; selecting and aligning denture library teeth from the selected denture tooth library to the digital reference denture model; generating a denture base digital model based on the digital reference denture model and the aligned denture library teeth; and fabricating a physical denture based from the denture base digital model.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

FIGS. 5A-B are cross-sectional side views that illustrate the attachment of an embodiment of a dentition coupling device of the clutch or reference structure of FIG. 2 to a dental implant.

DETAILED DESCRIPTION

Figure 1:
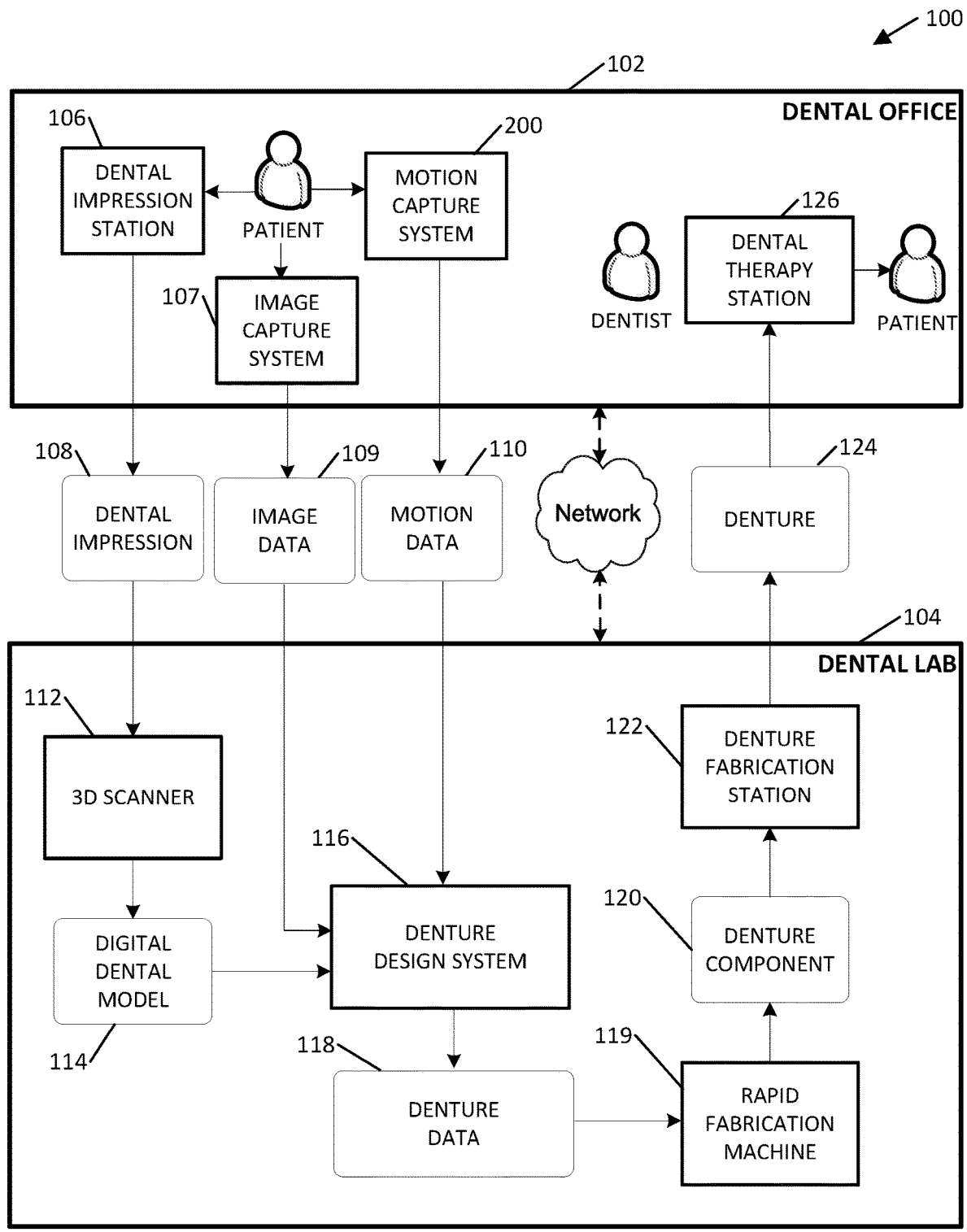
FIG. 1 is a schematic block diagram illustrating an example of a system for fabricating a motion-based denture.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure relates to motion-based digital denture design and motion-based digital dentures. For example, a motion-based digital denture design system may use actual motion data captured from a patient to aid in the design of dentures. The motion data may provide for dentures that fit the patient better than conventionally designed dentures that do not use actual motion data. For example, the teeth of the dentures may be positioned so as to avoid interfering with opposing teeth (e.g., opposing actual teeth or denture teeth) during patient biting motion. Embodiments may reduce the chair time and number of visits required to fit dentures to a patient. Embodiments may also provide for dentures that have balanced occlusal support throughout functional movements (e.g., excursive movements).

The motion-based digital denture design may be based on motion data captured by a motion capture system for jaw movement. For example, the motion capture system may record the motion of a patient's mandible relative to the patient's maxilla. In some embodiments, the system infers the approximate location of an axis corresponding to the condyloid process of the temporomandibular joint of the patient. The axis may be a hinge axis or a screw axis. Further, the system may generate a model of a range of motion of the mandible relative to the maxilla based on the inferred location of the axis, the recorded motion, or both.

In embodiments, the recorded motion is applied to a three-dimensional digital model of at least a portion of the patient's dentition. This motion can then be used while designing and fabricating dentures for the patient. In this manner, the dentures can be designed based on analysis of a range of actual motion for the patient.

FIG. 1 is a schematic block diagram illustrating an example of a system 100 for fabricating motion-based dentures, such as the denture 124 using jaw motion data captured by the motion capture system. In this example, the system 100 includes a dental office 102 and a dental lab 104.

The example dental office 102 includes a motion capture system 200 (which described further with respect to at least FIG. 2), a dental impression station 106, an image capture system 107, and a dental therapy station 126. Although shown as separate components in this figure, the image capture system 107 may be a sub-component of the motion capture system 200 (as described elsewhere herein).

Although shown as a single dental office in this figure, in some embodiments, the dental office 102 includes multiple dental offices. For example, in some embodiments, one or more of the dental impression station 106, the image capture system 107, and the motion capture system 200 are in a different dental office than the dental therapy station 126. Further, in some embodiments, one or more of the dental impression station 106, the motion capture system 200, and the dental therapy station 126 are not in a dental office.

The example dental impression station 106 generates a dental impression 108 of the dentition of the patient. The dental impression 108 is a geometric representation of the dentition of the patient, which may include teeth (if any) and edentulous (gum) tissue. In some embodiments, the dental impression 108 is a physical impression captured using an impression material, such as sodium alginate, polyvinylsiloxane or another impression material.

In some embodiments, the dental impression 108 is a digital impression. The digital impression may be represented by one or more of a point cloud, a polygonal mesh, a parametric model, or voxel data. In some embodiments, the digital impression is generated directly from the dentition of the patient, using for example an intraoral scanner. Example intraoral scanners include the TRIOS Intra Oral Digital Scanner, the Lava Chairside Oral Scanner C.O.S., the Cadent iTero, the Cerec AC, the Cyrtina IntraOral Scanner, and the Lythos Digital Impression System from Ormco. In other embodiments, a digital impression is captured using other imaging technologies, such as computed tomography (CT), including cone beam computed tomography (CBCT), ultrasound, and magnetic resonance imaging (MM). In yet other embodiments, the digital impression is generated from a physical impression by scanning the impression or plaster model of the dentition of the patient created from the physical impression. Examples of technologies for scanning a physical impression or model include three-dimensional laser scanners and computed tomography (CT) scanners. In yet other embodiments, digital impressions are created using other technologies.

An example motion capture system 200 captures a representation of the movement of the dental arches relative to each other. In some embodiments, the motion capture station generates motion data 110. In some embodiments, the dental impression 108 is used to generate a patient-specific dentition coupling device for capturing patient motion using the motion capture system 200. Some embodiments use other types of motion capture systems to generate motion data.

In some embodiments, the motion capture system 200 generates the motion data 110 from optical measurements of the dental arches that are captured while the dentition of the patient is moved. In some embodiments, the optical measurements are extracted from image or video data recorded while the dentition of the patient is moved. Additionally, in some embodiments, the optical measurements are captured indirectly. For example, in some embodiments, the optical measurements are extracted from images or video data of one or more devices (e.g., a patient assembly such as the patient assembly 204 that is illustrated and described with respect to at least FIGS. 2 & 3) that are secured to a portion of the dentition of the patient. In other embodiments, the motion data 110 is generated using other processes. Further, in some embodiments, the motion data 110 includes transformation matrices that represent the position and orientation of the dental arches. The motion data 110 may include a series of transformation matrices that represent various motions or functional paths of movement for the patient's dentition. Other embodiments of the motion data 110 are possible as well.

In some embodiments, still images are captured of the patient's dentition while the dentition of the patient is positioned in a plurality of bite locations. In some embodiments, image processing techniques are used to determine the positions of the patient's upper and lower arches relative to each other (either directly or based on the positions of the attached patient assembly 204). In some embodiments, the motion data 110 is generated by interpolating between the positions of the upper and lower arches determined from at least some of the captured images.

The motion data 110 may be captured with the patient's jaw in various static positions or moving through various motions. For example, the motion data 110 may include a static measurement representing a centric occlusion (i.e., the patient's mandible closed with teeth fully engaged) or centric relation (i.e., the patient's mandible nearly closed, just before any shift occurs that is induced by tooth engagement or contact) bite of a patient. The motion data 110 may also include static measurements or sequences of data corresponding to protrusive (i.e., the patient's mandible being shifted forward while closed), lateral excursive (i.e., the patient's mandible shifted/rotated left and right while closed), hinging (i.e., the patient's mandible opening and closing without lateral movement), chewing (i.e., the patient's mandible chewing naturally to, for example, determine the most commonly used tooth contact points), and border movements (i.e., the patient's mandible is shifted in all directions while closed, for example, to determine the full range of motion) of the patient's jaw. In some implementations, the motion data is captured while the patient is using a Lucia jig or leaf gauge so that the patient's teeth (for patients who are not completely edentulous) do not impact/contribute to the movement data. This motion data 110 may be used to determine properties of the patient's temporomandibular joint (TMJ). For example, hinging motion of the motion data 110 may be used to determine the location of the hinge axis of the patient's TMJ.

In some implementations, a representation of the motion of the hinge axis may be displayed while the motion data 110 is being captured. For example, a computing device may cause a line segment to be displayed in relation to a representation of the patient's dentition. The line segment may be displayed at a location that is approximately where the patient's condyle is located. The line segment may move in concert with the relative motion of the patient's mandible (lower dentition). Visually, the movement of the line may appear to rotate at a location approximately equal to the hinge axis of the patient's TMJ. Furthermore, during motion capture the caregiver may annotate the motion data to identify portions of the motion data such as the motion data corresponding to hinging open/closed. For example, the caregiver may actuate an input such as a button on a user interface, a physical button, or a foot pedal to annotate portions of the motion data.

The image capture system 107 may capture image data 109 of the patient. The image data 109 may include one or more static images or videos of the patient. The static images or frames with the image data 109 may be associated with the motion data 110. For example, a specific image from the image data 109 may be associated with a specific frame of the motion data 110, indicating that the specific image was captured while the patient's jaw was in the position indicated by the specific frame of the motion data 110. In some implementations, the image capture system 107 includes a three-dimensional camera and the image data 109 may include one or more three-dimensional images. Examples of three-dimensional cameras include stereo cameras (e.g., using two or more separate image sensors that are offset from one another). The three-dimensional camera may also include a projector such as a light projector or laser projector that operates to project a pattern on the patient's face. For example, the projector may be offset relative to the camera or cameras so that the images captured by the camera include distortions of the projected pattern caused by the patient's face. Based on these distortions, the three-dimensional structure of portions of the patient's face can be approximated. Various embodiments project various patterns such as one or more stripes or fringes (i.e., sinusoidally changing intensity values). In some implementations, the three-dimensional image is captured in relation to the motion capture system 200 or a portion thereof so that the three-dimensional images can be related to the same coordinate system as the motion data.

The example dental lab 104 includes a 3D scanner 112, a denture design system 116, a rapid fabrication machine 119, and a denture fabrication station 122. Although shown as a single dental lab in this figure, in some embodiments, the dental lab 104 comprises multiple dental labs. For example, in some embodiments, the 3D scanner 112 is in a different dental lab than one or more of the other components shown in the dental lab 104. Further, in some embodiments, one or more of the components shown in the dental lab 104 are not in a dental lab. For example, in some embodiments, one or more of the 3D scanner 112, denture design system 116, rapid fabrication machine 119, and denture fabrication station 122 are in the dental office 102. Additionally, some embodiments of the system 100 do not include all of the components shown in the dental lab 104.

The example 3D scanner 112 is a device configured to create a three-dimensional digital representation of the dental impression 108. In some embodiments, the 3D scanner 112 generates a point cloud, a polygonal mesh, a parametric model, or voxel data representing the dental impression 108. In some embodiments, the 3D scanner 112 generates a digital dental model 114. In some embodiments, the 3D scanner 112 comprises a laser scanner, a touch probe, or an industrial CT scanner. Yet other embodiments of the 3D scanner 112 are possible as well. Further, some embodiments of the system 100 do not include the 3D scanner 112. For example, in some embodiments of the system 100 where the dental impression station 106 generates a digital dental impression, the 3D scanner 112 is not included. In these embodiments, the dental impression 108 may be the digital dental model 114 or may be used directly to generate the digital dental model 114.

The denture design system 116 is a system that is configured to generate denture data 118. In some embodiments, the denture data 118 is three-dimensional digital data that represents a denture component 120 and is in a format suitable for fabrication using the rapid fabrication machine 119.

The denture design system 116 may use the digital dental model 114, the image data 109, and the motion data 110 to generate the denture data 118. For example, the denture design system 116 may generate a denture base having a geometric form that is shaped to fit a portion of the digital dental model 114 (e.g., a portion of the model representing an edentulous region of the patient's dentition). The denture design system 116 may also determine various parameters that are used to generate the denture data 118 based on the image data 109. For example, embodiments of the denture design system 116 may use various image processing techniques to estimate a vertical dimension parameter from the image data 109. Additionally, the denture design system 116 may use the motion data 110 to design the denture data 118. For example, the denture design system may use the motion data to ensure that the denture design avoids interferences with the opposing dentition (or dentures) during the bite motion represented by the motion data 110.

In some embodiments, the denture design system 116 comprises a computing device including user input devices. The denture design system 116 may include computer-aided-design (CAD) software that generates a graphical display of the denture data 118 and allows an operator to interact with and manipulate the denture data 118. In some implementations, the denture design system 116 may include a user interface that allows a user to specify or adjust parameters of the denture design such as vertical dimension, overbite, overjet, or tip, torque, and rotation parameters for one or more denture teeth.

For example, the denture design system 116 may include virtual tools that mimic the tools and techniques used by a laboratory technician to physically design a denture. In some implementations, the denture design system 116 includes a user interface tool to move a digital representation of the patient's dentition (e.g., the digital dental model 114) according to the motion data 110 (which may be similar to a physical articulator). Additionally, in some embodiments, the denture design system 116 includes a server that partially or fully automates the generation of designs of the denture data 118, which may use the motion data 110.

In some embodiments, the rapid fabrication machine 119 comprises one or more three-dimensional printers, such as the ProJet line of printers from 3D Systems, Inc. of Rock Hill, South Carolina. Another example of the rapid fabrication machine 119 is stereolithography equipment. Yet another example of the rapid fabrication machine 119 is a milling device, such as a computer numerically controlled (CNC) milling device. In some embodiments, the rapid fabrication machine 119 is configured to receive files in the STL format. Other embodiments of the rapid fabrication machine 119 are possible as well.

Additionally, in some embodiments, the rapid fabrication machine 119 is configured to use the denture data 118 to fabricate the denture component 120. In some embodiments, the denture component 120 is a physical component that is configured to be used as part or all of the denture 124. For example, in some embodiments, the denture component 120 is milled from zirconium, acrylic, or another material that is used directly as a dental appliance. In other embodiments, the denture component 120 is a mold formed from wax or another material and is configured to be used indirectly (e.g., through a lost wax casting or ceramic pressing process) to fabricate the denture 124. Further, in some embodiments, the denture component 120 is formed using laser sintering technology.

In some embodiments, the denture fabrication station 122 operates to fabricate a denture 124 for the patient. In some embodiments, the denture fabrication station 122 uses the denture component 120 produced by the rapid fabrication machine 119. In some embodiments, the denture 124 is a complete or partial denture. The denture 124 may include one or both of a maxillary denture and a mandibular denture. In some embodiments, the denture 124 is formed from an acrylic, ceramic, or metallic material. In some embodiments, the dental impression 108 is used in the fabrication of the denture 124. In some embodiments, the dental impression 108 is used to form a plaster model of the dentition of the patient. Additionally, in some embodiments, a model of the dentition of the patient is generated by the rapid fabrication machine 119. In some embodiments, the denture fabrication station 122 includes equipment and processes to perform some or all of the techniques used in traditional dental laboratories to generate dental appliances. Other embodiments of the denture fabrication station 122 are possible as well.

In some embodiments, the denture 124 is seated in the mouth of the patient in the dental therapy station 126 by a dentist. In some embodiments, the dentist confirms that the occlusal surface of the denture 124 is properly defined by instructing the patient to engage in various bites.

Additionally, in some embodiments, the dental office 102 is connected to the dental lab 104 via a network. The network may be an electronic communication network that facilitates communication between the dental office 102 and the dental lab 104. An electronic communication network is a set of computing devices and links between the computing devices. The computing devices in the network use the links to enable communication among the computing devices in the network. The network can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network includes various types of links. For example, the network can include one or both of wired and wireless links, including Bluetooth, ultra-wideband (UWB), 802.11, ZigBee, and other types of wireless links. Furthermore, in various embodiments, the network is implemented at various scales. For example, the network can be implemented as one or more local area networks (LANs), metropolitan area networks, subnets, wide area networks (such as the Internet), or can be implemented at another scale.

In some implementations, the system 100 also plans treatments for implant supported dentures. For example, the system 100 may determine appropriate positions for implants based on a denture design. Some embodiments may generate digital design data for an implant surgical guide and fabricate the implant surgical guide using rapid fabrication technology. Beneficially, in at least some of these implementations, the location of implants can be determined based, at least in part, on the design of the final dentures.

Although not shown in this figure, some implementations of the system may integrate with one or more of an inventory management system and a parts management system. Based on the design of a denture or implant-supported denture treatment plan, a part pick list may be generated that lists the different components (e.g., denture teeth, implant abutments, support components). An inventory system may also be updated to adjust the quantities of parts and one or more orders may be generated and directed to one or more suppliers.

Figure 2:
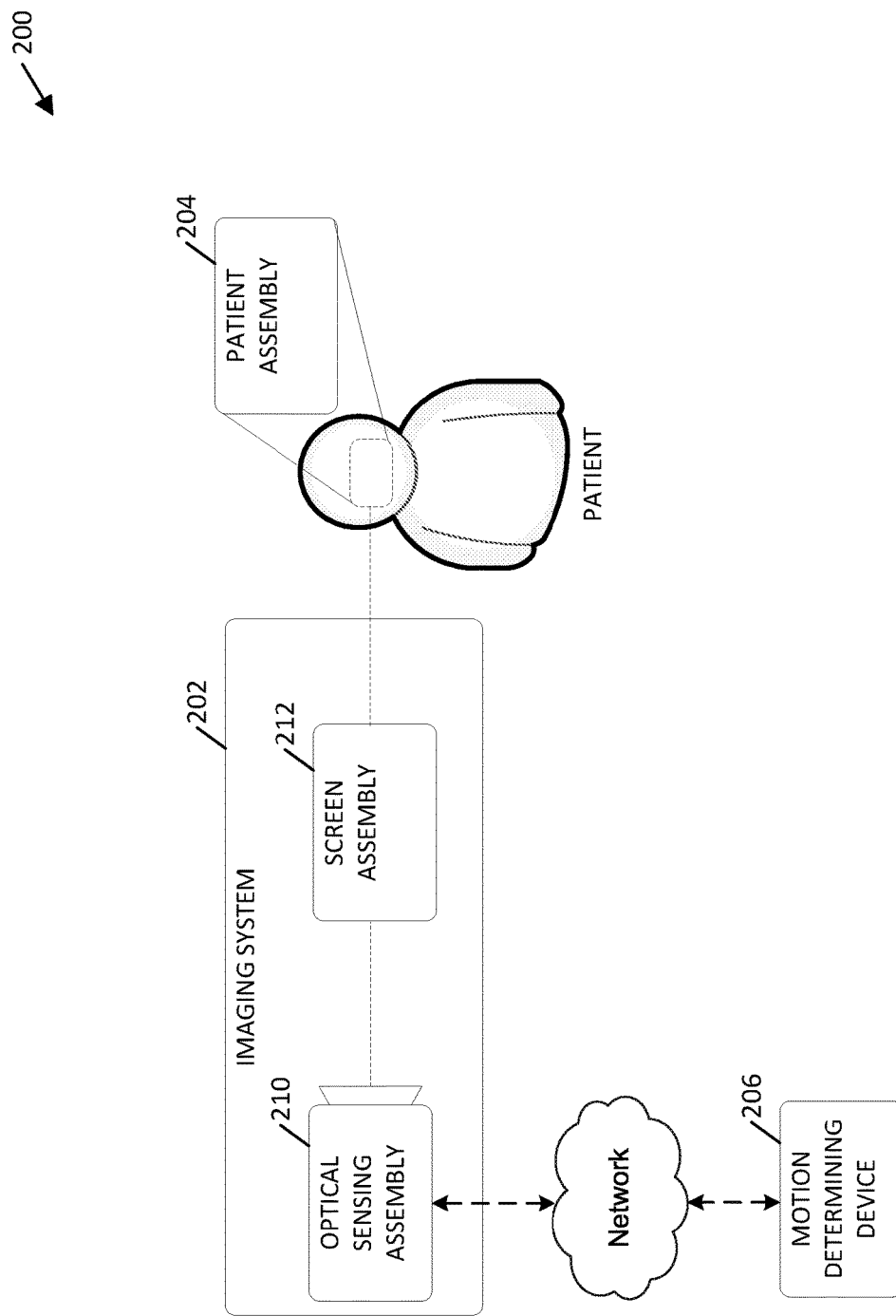
FIG. 2 is a schematic block diagram illustrating an example motion capture system for capturing jaw movement.

FIG. 2 is a schematic block diagram illustrating an example motion capture system 200 for capturing jaw movement. In this example, the motion capture system 200 includes an imaging system 202, a patient assembly 204, and a motion determining device 206. Also shown in FIG. 1 are a patient and a network.

In some embodiments, the imaging system 202 includes an optical sensing assembly 210 and a screen assembly 212. The optical sensing assembly 210 may capture a plurality of images as the patient's jaw moves. For example, the optical sensing assembly 210 may include one or more cameras such as video cameras. In some embodiments, the optical sensing assembly 210 captures a plurality of images that do not necessarily include the patient assembly, but can be used to determine the position of the patient assembly 204. For example, the patient assembly 204 may emit lights that project onto surfaces of the screen assembly 212 and the optical sensing assembly 210 may capture images of those surfaces of the screen assembly 212. In some implementations, the optical sensing assembly 210 does not capture images but otherwise determines the position of the projected light or lights on the surfaces of the screen assembly 212.

The screen assembly 212 may include one or more screens. A screen may include any type of surface upon which light may be projected. Some implementations include flat screens that have a planar surface. Some implementations may include rounded screens, having cylindrical (or partially cylindrical) surfaces. The screens may be formed from a translucent material. For example, the locations of the lights projected on the screens of the screen assembly 212 may be visible from a side of the screens opposite the patient assembly 204 (e.g., the screen assembly 212 may be positioned between the optical sensing assembly 210 and the patient assembly 204).

In addition to capturing the images, the imaging system 202 may capture or generate various information about the images. As an example, the imaging system 202 may generate timing information about the images. Although alternatives are possible, the timing information can include a timestamp for each of the images. Alternatively or additionally, a frame rate (e.g., 10 frames/second, 24 frames/second, 60 frames/second) is stored with a group of images. Other types of information that can be generated for the images includes an identifier of a camera, a position of a camera, or settings used when capturing the image.

The patient assembly 204 is an assembly that is configured to be secured to the patient. The patient assembly 204 or parts thereof may be worn by the patient and may move freely with the patient (i.e., at least a part of the patient assembly 204 may, when mounted to the patient, move in concert with patient head movement). In contrast, in at least some implementations, the imaging system 202 is not mounted to the patient and does not move in concert with patient head movement.

In some embodiments, the patient assembly 204 may include light emitters (or projectors) that emit a pattern of light that projects on one or more surfaces (e.g., screens of the screen assembly 212), which can be imaged to determine the position of the patient assembly 204. For example, the light emitters may emit beams of substantially collimated light (e.g., laser beams) that project onto the surfaces as points. Based on the locations of these points on the surfaces, a coordinate system can be determined for the patient assembly 204, which can then be used to determine a position and orientation of the patient assembly 204 and the patient's dentition.

In some embodiments, the patient assembly 204 includes separate components that are configured to be worn on the upper dentition and the lower dentition and to move independently of each other so that the motion of the lower dentition relative to the upper dentition can be determined. Examples of the patient assembly 204 are illustrated and described throughout, including in FIG. 3.

The motion determining device 206 determines the motion of the patient assembly 204 based on images captured by the imaging system 202. In some embodiments, the motion determining device 206 includes a computing device that uses image processing techniques to determine three-dimensional coordinates of the patient assembly 204 (or portions of the patient assembly) as the patient's jaw is in different positions. For example, images captured by the optical sensing assembly 210 of screens of the screen assembly 212 may be processed to determine the positions on the screens at which light from the patient assembly is projected. These positions on the screens of the screen assembly 212 may be converted to three-dimensional coordinates with respect to the screen assembly 212. From those three-dimensional coordinates, one or more positions and orientations of the patient assembly 204 (or components of the patient assembly 204) may be determined.

Based on the determined positions and orientations of the patient assembly 204, some embodiments determine the relative positions and movements of the patient's upper and lower dentition. Further, some embodiments infer the location of a kinematically derived axis that is usable in modeling the motion of the patient's mandible (including the lower dentition) about the temporomandibular joint. The kinematically derived axis may be a hinge axis or a screw axis. For example, the hinge axis may be derived from a portion of the motion data (e.g., the motion date corresponding to a hinging open/closed of the patient's jaw). The hinge axis location may also be determined based on radiographic imaging such as CBCT data. Additional motion data may be synthesized based on the location of the hinge axis. For example, if the location of the hinge axis is inferred based on motion data corresponding to hinging open/closed, motion data for other bite movements (e.g., excursive or protrusive movements) may be synthesized based on that hinge axis.

Figure 3:
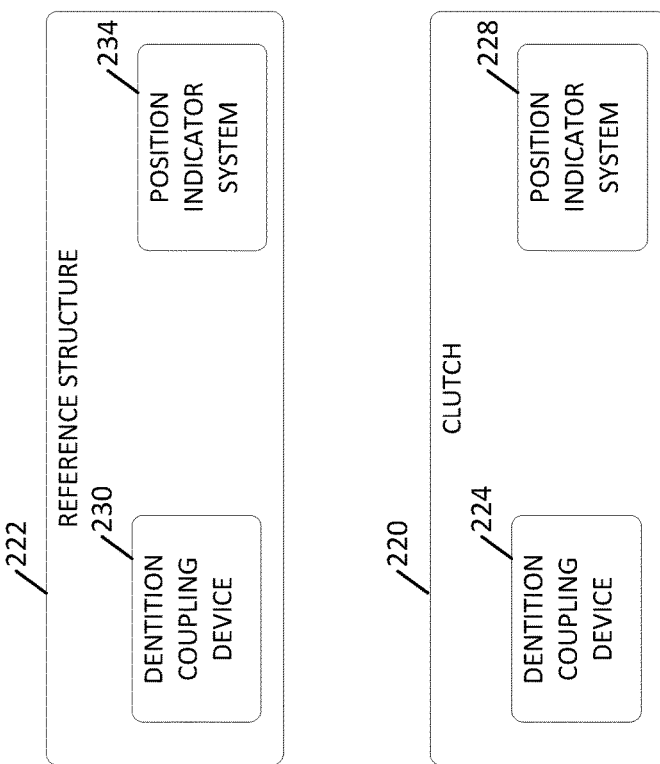
FIG. 3 illustrates a block diagram of an example patient assembly of FIG. 2.

FIG. 3 illustrates a block diagram of an example patient assembly 204. In this example, the patient assembly includes a clutch 220 and a reference structure 222. Here, the clutch 220 and the reference structure 222 are not physically connected and can move independently of one another.

The clutch 220 is a device that is configured to couple to a patient's dentition. For example, the clutch 220 may grip any remaining teeth of the dentition of the patient. In some embodiments, the clutch 220 may couple to an edentulous region of a patient's dentition or to dental implants that have been placed in edentulous regions of the patient's dentition.

In some embodiments, the clutch 220 comprises a dentition coupling device 224 and a position indicator system 228. In some embodiments, the clutch 220 is configured to couple to the lower dentition of the patient so as to move with the patient's mandible. In other embodiments, the clutch 220 may be configured to couple to the patient's upper dentition so as to move with the patient's maxilla.

The dentition coupling device 224 is configured to removably couple to the patient's dentition. In some embodiments, the dentition coupling device 224 rigidly couples to the patient's dentition such that while coupled, the movement of the dentition coupling device 224 relative to the patient's dentition is minimized. Various embodiments include various coupling mechanisms.

For example, some embodiments couple to the patient's dentition using brackets that are adhered to the patient's teeth with a dental or orthodontic adhesive. As another example, some embodiments couple to the patient's dentition using an impression material. For example, some embodiments of the dentition coupling device 224 comprise an impression tray and an impression material such as polyvinyl siloxane. To couple the dentition coupling device 224 to the patient's dentition, the impression tray is filled with impression material and then placed over the patient's dentition. As the impression material hardens, the dentition coupling device 224 couples to the patient's dentition.

Alternatively, some embodiments comprise a dentition coupling device 224 that is custom designed for a patient based on a three-dimensional model of the patient's dentition. For example, the dentition coupling device 224 may be formed using a rapid fabrication machine. One example of a rapid fabrication machine is a three-dimensional printer, such as the PROJET® line of printers from 3D Systems, Inc. of Rock Hill, South Carolina. Another example of a rapid fabrication machine is a milling device, such as a computer numerically controlled (CNC) milling device. In these embodiments, the dentition coupling device 224 may comprise various mechanical retention devices such as clasps that are configured to fit in an undercut region of the patient's dentition or wrap around any remaining teeth.

Embodiments of the dentition coupling device 224 may couple to the patient's dentition using a combination of one or more mechanical retention structures, adhesives, and impression materials. For example, the dentition coupling device 224 may include apertures through which a fastening device (also referred to as a fastener) such as a temporary anchorage device may be threaded to secure the dentition coupling device 224 to the patient's dentition, gum tissue, or underlying bone tissue. For example, the temporary anchorage devices may screw into the patient's bone tissue to secure the dentition coupling device 224.

In some embodiments, the dentition coupling device 224 includes one or more fiducial markers, such as hemispherical inserts, that can be used to establish a static relationship between the position of the clutch 220 and the patient's dentition. For example, the dentition coupling device 224 may include three fiducial markers disposed along its surface. The location of these fiducial markers can then be determined relative to the patient's dentition such as by capturing a physical impression of the patient with the clutch attached or using imaging techniques such as capturing a digital impression (e.g., with an intraoral scanner) or other types of images of the dentition and fiducial markers. Some embodiments of the dentition coupling device 224 do not include fiducial markers. One or more images or a digital impression of the patient's dentition captured while the dentition coupling device 224 is mounted may be aligned to one or more images or a digital impression of the patient's dentition captured while the dentition coupling device 224 is not mounted.

The position indicator system 228 is a system that is configured to be used to determine the position and orientation of the clutch 220. In some embodiments, the position indicator system 228 includes multiple fiducial markers. In some examples, the fiducial markers are spheres. Spheres work well as fiducial markers because the location of the center of the sphere can be determined in an image regardless of the angle from which the image containing the sphere was captured. The multiple fiducial markers may be disposed (e.g., non-collinearly) so that by determining the locations of each (or at least three) of the fiducial markers, the position and orientation of the clutch 220 can be determined. For example, these fiducial markers may be used to determine the position of the position indicator system 228 relative to the dentition coupling device 224, through which the position of the position indicator system 228 relative to the patient's dentition can be determined.

Some implementations of the position indicator system 228 do not include separate fiducial markers. In at least some of these implementations, structural aspects of the position indicator system 228 may be used to determine the position and orientation of the position indicator system 228. For example, one or more flat surfaces, edges, or corners of the position indicator system 228 may be imaged to determine the position and orientation of the position indicator system 228. In some implementations, an intraoral scanner is used to capture a three-dimensional model (or image) that includes a corner of the position indicator system 228 and at least part of the patient's dentition while the dentition coupling device 224 is mounted. This three-dimensional model can then be used to determine a relationship between the position indicator system 228 and the patient's dentition. The determined relationship may be a static relationship that defines the position and orientation of the position indicator system 228 relative to a three-dimensional model of the patient's dentition (e.g., based on the corner of the position indicator system 228 that was captured by the intraoral scanner).

In some embodiments, the position indicator system 228 includes a light source assembly that emits beams of light.

The light source assembly may emit substantially collimated light beams (e.g., laser beams). In some embodiments, the light source assembly is rigidly coupled to the dentition coupling device 224 so that as the dentition coupling device 224 moves with the patient's dentition, the beams of light move. The position of the dentition coupling device 224 is then determined by capturing images of where the light beams intersect with various surfaces (e.g., translucent screens disposed around the patient). Embodiments that include a light source assembly are illustrated and described throughout.

The reference structure 222 is a structure that is configured to be worn by the patient so as to provide a point of reference to measure the motion of the clutch 220. In embodiments where the clutch 220 is configured to couple to the patient's lower dentition, the reference structure 222 is configured to mount elsewhere on the patient's head so that the motion of the clutch 220 (and the patient's mandible) can be measured relative to the rest of the patient's head. For example, the reference structure 222 may be worn on the upper dentition. Beneficially, when the reference structure 222 is mounted securely to the patient's upper dentition, the position of the reference structure 222 will not be impacted by the movement of the mandible (e.g., muscle and skin movement associated with the mandibular motion will not affect the position of the reference structure 222). Alternatively, the reference structure 222 may be configured to be worn elsewhere on the patient's face or head.

In some embodiments, the reference structure 222 is similar to the clutch 220 but configured to be worn on the dental arch opposite the clutch (e.g., the upper dentition if the clutch 220 is for the lower dentition). For example, the reference structure 222 shown in FIG. 3 includes a dentition coupling device 230 that may be similar to the dentition coupling device 224, and a position indicator system 234 that may be similar to the position indicator system 228.

In some implementations, the patient assembly 204 includes a gothic arch tracer. For example, the clutch 220 may include one or more tracing components that may move across a surface of the reference structure 222. The tracing components may have adjustable heights.

Figure 4:
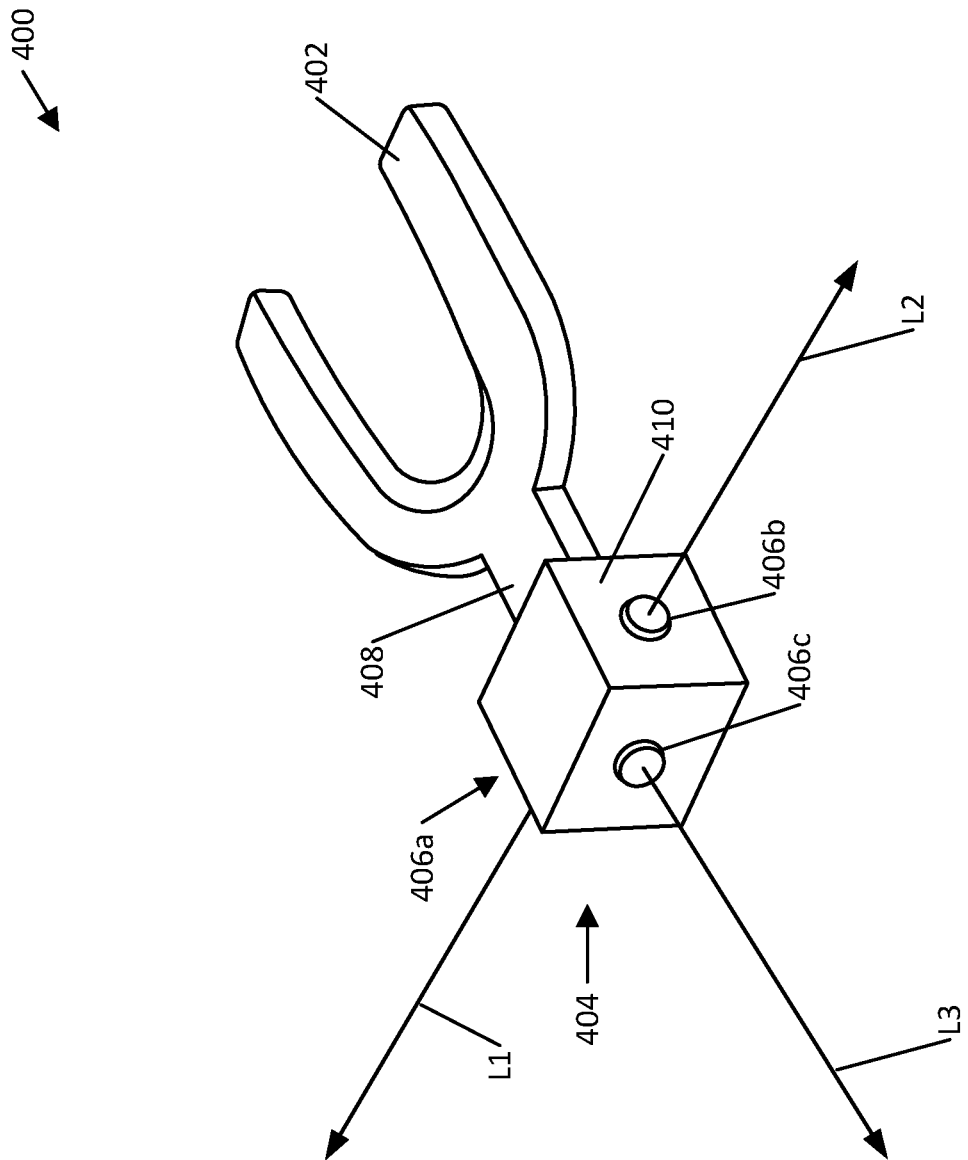
FIG. 4 illustrates an example embodiment of the clutch of FIG. 3.

FIG. 4 illustrates an embodiment of a clutch 400. The clutch 400 is an example of the clutch 220. In this example, the clutch 400 includes a dentition coupling device 402 and a light source assembly 404, and an extension member 408. The dentition coupling device 402 is an example of the dentition coupling device 224, and the light source assembly 404 is an example of the position indicator system 228.

The light source assembly 404, which may also be referred to as a projector, is a device that emits light beams comprising light that is substantially collimated. Collimated light travels in one direction. A laser beam is an example of collimated light. In some embodiments, the light source assembly 404 includes one or more lasers. Although alternatives are possible, the one or more lasers may be semi-conductor lasers such as laser diodes or solid-state lasers such as diode-pumped solid-state lasers.

In some embodiments, the light source assembly 404 comprises a first, second, and third light emitter. The first and second light emitters may emit substantially collimated light in parallel but opposite directions (i.e., the first and second light emitters may emit light in antiparallel directions) such as to the left and right of the patient when the clutch 400 is coupled to the patient's dentition. In some embodiments, the first and second light emitters are collinear or are substantially collinear (e.g., offset by a small amount such as less than 5 micrometers, less than 10 micrometers, less than 25 micrometers, less than 50 micrometers, or less than 100 micrometers). The third light emitter may emit substantially collimated light in a direction of a line that intersects with or substantially intersects with lines corresponding to the direction of the first and second light emitters. Lines that intersect share a common point. Lines that substantially intersect do not necessarily share a common point, but would intersect if offset by a small amount such as less than 5 micrometers, less than 10 micrometers, less than 25 micrometers, less than 50 micrometers, or less than 100 micrometers. In some embodiments, the third light emitter emits light in a direction that is perpendicular to the first and second light emitters, such as toward the direction the patient is facing.

In some embodiments, the third light emitter emits light in a direction that is offset from the direction of the first light emitter so as to be directed toward the same side of the patient as the direction of the first light emitter. For example, the third light emitter may be offset from the first light emitter by an offset angle that is an acute angle. The third light emitter may be offset from the first light emitter by an offset angle that is less than 90 degrees such that the light emitted by both the first light emitter and the second light emitter intersect with the same screen (e.g., a planar screen having a rectangular shape and being disposed on a side of the patient). The third light emitter may be offset from the first light emitter by an offset angle of between approximately 1 degree to 45 degrees. In some implementations, the offset angle is between 3 degrees and 30 degrees. In some implementations, the offset angle is between 5 degrees and 15 degrees. For example, the offset angle may be less than 10 degrees.

In some embodiments, one or more compensation factors are determined to compensate for an offset from the first and second light emitters being collinear, or an offset from the third light emitter emitting light in a direction of a line that intersects with the directions of the first and second light sources. A compensation factor may also be determined for the offset angle of the third light emitter with respect to the first and second light emitters. For example, an offset angle compensation factor may specify the angle between the direction of the third light emitter and a line defined by the first light emitter. In implementations in which the orientation of the third light emitter is directed perpendicular to or substantially perpendicular to the direction of the first light emitter, the offset angle compensation factor may be 90 degrees or approximately 90 degrees. In implementations in which the orientation of the third light emitter is directed toward a side of the patient, the offset angle compensation factor may, for example, be between approximately 5 and 45 degrees. The compensation factors may be determined specifically for each position indicator system manufactured to account for minor variation in manufacturing and assembly. The compensation factors may be stored in a datastore (such as on the motion determining device 206 or on a computer readable medium accessible by the motion determining device 206). Each position indicator system may be associated with a unique identifier that can be used to retrieve the associated compensation factor. The position indicator system 234 may include a label with the unique identifier or a barcode, QR code, etc. that specifies the unique identifier.

Some embodiments of the light source assembly 404 include a single light source and use one or more beam splitters such as prisms or reflectors such as mirrors to cause that light source to function as multiple light emitters by splitting the light emitted by that light source into multiple beams. In at least some embodiments, the emitted light emanates from a common point. As another example, some embodiments of the light source assembly 404 may comprise apertures or tubes through which light from a common source is directed. Some embodiments may include separate light sources for each of the light emitters.

In the example of FIG. 3, the light source assembly 404 includes light emitters 406a, 406b, and 406c (referred to collectively as light emitters 406) and a housing 410. The light emitter 406a is emitting a light beam L1, the light emitter 406b is emitting a light beam L2, and the light emitter 406c is emitting a light beam L3. The light beams L1 and L2 are parallel to each other, but directed in opposite directions. The light beam L3 is perpendicular to the light beams L1 and L2. In at least some embodiments, the housing 410 is configured to position the light emitters 406 so that the light beams L1, L2, and L3 are approximately coplanar with the occlusal plane of the patient's dentition. Although the light beam L3 is perpendicular to the light beams L1 and L2 in the example of FIG. 3, alternatives are possible.

The housing 410 may be approximately cube shaped and includes apertures through which the light emitters 406 extend. In other embodiments, the light emitters do not extend through apertures in the housing 410 and instead light emitted by the light emitters 406 passes through apertures in the housing 410.

In the example of FIG. 4, the dentition coupling device 402 is rigidly coupled to the light source assembly 404 by an extension member 408. The extension member 408 extends from the dentition coupling device 402 and is configured to extend out of the patient's mouth when the dentition coupling device 402 is worn on the patient's dentition. In some embodiments, the extension member 408 is configured so as to be permanently attached to the light source assembly 404 such as by being formed integrally with the housing 410 or joined by welding or a permanent adhesive. In other embodiments, the extension member 408 is configured to removably attach to the light source assembly 404. Because the light source assembly 404 is rigidly coupled to the dentition coupling device 402, the position and orientation of the dentition coupling device 402 can be determined from the position and orientation of the light source assembly 404.

In some embodiments, the housing 410 and the dentition coupling device 402 are integral (e.g., are formed from a single material or are coupled together in a manner that is not configured to be separated by a user). In some embodiments, the housing 410 includes a coupling structure configured to removably couple to the extension member 408 of the dentition coupling device 402. In this manner, the dentition coupling device 402 can be a disposable component that may be custom fabricated for each patient, while the light source assembly 404 may be reused with multiple dentition coupling devices. In some embodiments, the housing 410 includes a connector that is configured to mate with a connector on the dentition coupling device 402.

Additionally or alternatively, the housing 410 may couple to the dentition coupling device 402 with a magnetic clasp. Some embodiments include a registration structure that is configured to cause the housing 410 to join with the dentition coupling device 402 in a repeatable arrangement and orientation. In some embodiments, the registration structure comprises a plurality of pins and corresponding receivers. In an example, the registration structure includes a plurality of pins disposed on the housing 410 and corresponding receivers (e.g., holes) in the dentition coupling device 402 (or vice versa). In some embodiments, the registration structure comprises a plurality of spherical attachments and a plurality of grooves. In one example, the registration structure includes three or more spherical attachments disposed on the housing 410 and two or more v-shaped grooves disposed on the dentition coupling device 402 that are disposed such that the spherical attachments will only fit into the grooves when the housing 410 is in a specific orientation and position relative to the dentition coupling device 402. In some implementations, the registration structure includes a spring-mounted pin or screw that serves as a detent to impede movement of the housing 410 with respect to the dentition coupling device 402.

FIGS. 5A-B are cross-sectional side views that illustrate the attachment of an embodiment of a dentition coupling device 520 to a dental implant 522. The dentition coupling device 520 is an example of the dentition coupling device 224 or the dentition coupling device 230. The dentition coupling device 520 may include one or more fixed arms and one or more pivotable arms that can be positioned to align with the patient's dentition.

FIG. 5A is a cross-sectional side view that illustrates an implant abutment 526 attached to a dental implant 522 that is disposed in the patient's gingival tissue G. The implant abutment 526 is held in place with an implant screw 524. The implant screw 524 has threads that mate with corresponding threads in a receiver of the dental implant 522. A patient receiving dentures may have several dental implants placed to support and secure the denture.

FIG. 5B is a cross-sectional side view of the dental implant 522 and gingival tissue G with the implant abutment 526 removed and the dentition coupling device 520 attached to the dental implant 522. Here, the implant screw 524 passes through a slot 592 of an arm 590 of the dentition coupling device 520, through an offset 528, and into the dental implant 522. As shown in this figure, at least a portion of the threads of the implant screw 524 are interlocked with the threads of the receiver of the dental implant 522. The offset 528 may be a cylindrical structure that includes an aperture through which a portion of the implant screw 524 may pass. For example, an aperture in the offset 528 may allow passage of the threaded portion of the implant screw 524 but not the head of the implant screw 524. The offset 528 may be sized in the occlusal dimension (0) so as to offset the arm 590 from the gingival tissue G.

Some implementations use a washer to couple the implant screw 524 to the arm 590 (e.g., when an aperture in the arm 590 is larger than the head of the screw). The washer may be formed from a flexible material such as rubber. In some implementations, the arm 590 may be secured to the threads of the receiver of the dental implant 522 with a scanning abutment. A scanning abutment may include a threaded region that is sized to fit into and mate with the threads of the receiver of the dental implant 522. The scanning abutment may also include a fiducial structure that can used to determine a location and orientation of the implant 522 when the scanning abutment is attached. For example, the scanning abutment may be imaged with a component of the image capture system (e.g., an intraoral scanner or a 2D or 3D camera) to determine the locations of the associated dental implant.

Figure 6:
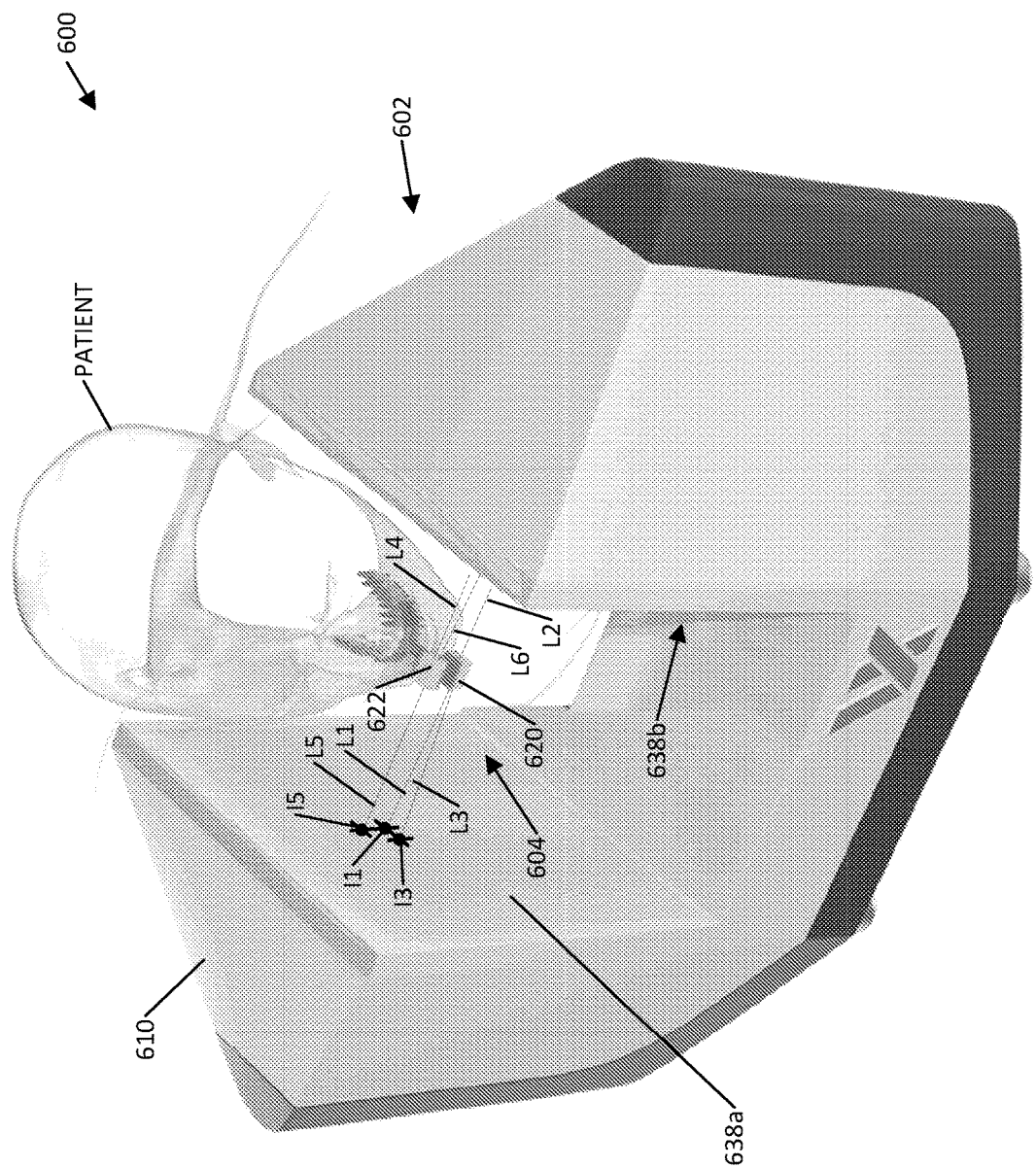
FIG. 6 includes an example of the motion capture system of FIG. 1 in which two screens are used.

FIG. 6 illustrates an implementation of a motion capture system 600 for capturing jaw movement in which only two screens are used. The motion capture system 600 is an example of the motion capture system 200. The motion capture system 600 includes an imaging system 602 and a patient assembly 604. In this example, the imaging system 602 includes a housing 610. The imaging system also includes screen 638a and a screen 638b (collectively referred to as screens 638), which are positioned so as to be on opposite sides of the patient's face (e.g., screen 638b to the left of the patient's face and screen 638a to the right of the patient's face). In some implementations, a screen framework is disposed within the housing 610 to position the screens 638 with respect to each other and the housing 610.

As can be seen in FIG. 6, this implementation does not include a screen disposed in front of the patient's face. Beneficially, by not having a screen in front of a patient's face, the motion capture system 600 may allow better access to the patient's face by a caregiver. Also shown is patient assembly 604 of the motion capture system 600.

In at least some implementations, the patient assembly 604 includes a clutch 620 and a reference structure 622, each of which include a light source assembly having three light emitters. The clutch 620 is an example of the clutch 220 and the reference structure 622 is an example of the reference structure 222. In FIG. 6, the clutch 620 is attached to the patient's mandible (i.e., lower dentition) and is emitting light beams L1, L2, and L3. Light beams L1 and L3 are directed toward the screen 638a, intersecting at intersection points I1 and I3, respectively. Light beam L2 is directed toward the screen 638b. Although alternatives are possible, in this example, the light beams L1 and L3 are offset from each other by approximately 15 degrees. The light beams L1 and L2 are collinear and directed in opposite directions (i.e., L2 is offset from L1 by 180 degrees).

The reference structure 622 is attached to the patient's maxilla (i.e., upper dentition) and is emitting light beams L4, L5, and L6. Light beams L4 and L6 are directed toward the screen 638b. Light beam L5 is directed toward the screen 638a, intersecting at intersection point I5. Although alternatives are possible, in this example, the light beams L4 and L6 are offset from each other by approximately 15 degrees. The light beams L4 and L5 are collinear and directed in opposite directions (i.e., L4 is offset from L5 by 180 degrees).

As the patient's dentition moves around, the clutch 620 and the reference structure 622 will move in concert with the patient's dentition, causing the light beams to move and the intersection points to change. An optical sensing assembly of the motion capture system 600 (e.g., cameras embedded within the housing 610 of the motion capture system 600 behind the screens 638a and 638b) may capture images of the screens 638 so that the intersection points can be determined.

The location of a first axis associated with the clutch 620 may be identified based on the intersection points from the light beams L1 and L2. An intersection coordinate between the light beams L1 and L3 may then be determined based on the distance between the intersection points I1 and I3 on the screen 638a. For example, the distance from the intersection point I1 along the first axis can be determined based on the distance between the points I1 and I3 and the angle between I1 and I3. As described in more detail elsewhere herein, the angle between I1 and I3 is determined for the clutch 620 and may be stored in a data store, for example, on a non-transitory computer-readable storage medium. Using this distance, the intersection coordinate can be found, which will have a known relationship to the clutch 620 and therefore the patient's dentition. As has been described earlier, a coordinate system for the clutch 620 can be determined based on the intersection points too (e.g., a second axis is defined by the cross product of the first axis and a vector between the intersection points I1 and I3, and a third axis is defined by the cross product of the first axis and the second axis). In a similar manner, the position and orientation of the reference structure 622 can be determined based on the intersection points of the light beams L4, L5, and L6 with the screens 638a and 638b.

In some implementations, three-dimensional coordinate systems for the clutch and the reference structure are determined using only two screens. In some implementations, the motion capture system includes only two screens and the motion capture system does not include a third screen. In some implementations, the imaging system captures images of only two screens. Some implementations identify intersection points using images captured of only two screens. For example, two intersection points from light beams emitted by a reference structure are identified on an image of the same screen.

In some implementations, a light emitter being oriented to emit light in a first direction toward the screen means the light emitter is oriented to emit light in a first direction toward the screen when the light emitter is attached to a patient (or other structure) and positioned for motion tracking with respect to the imaging system.

Figure 7:
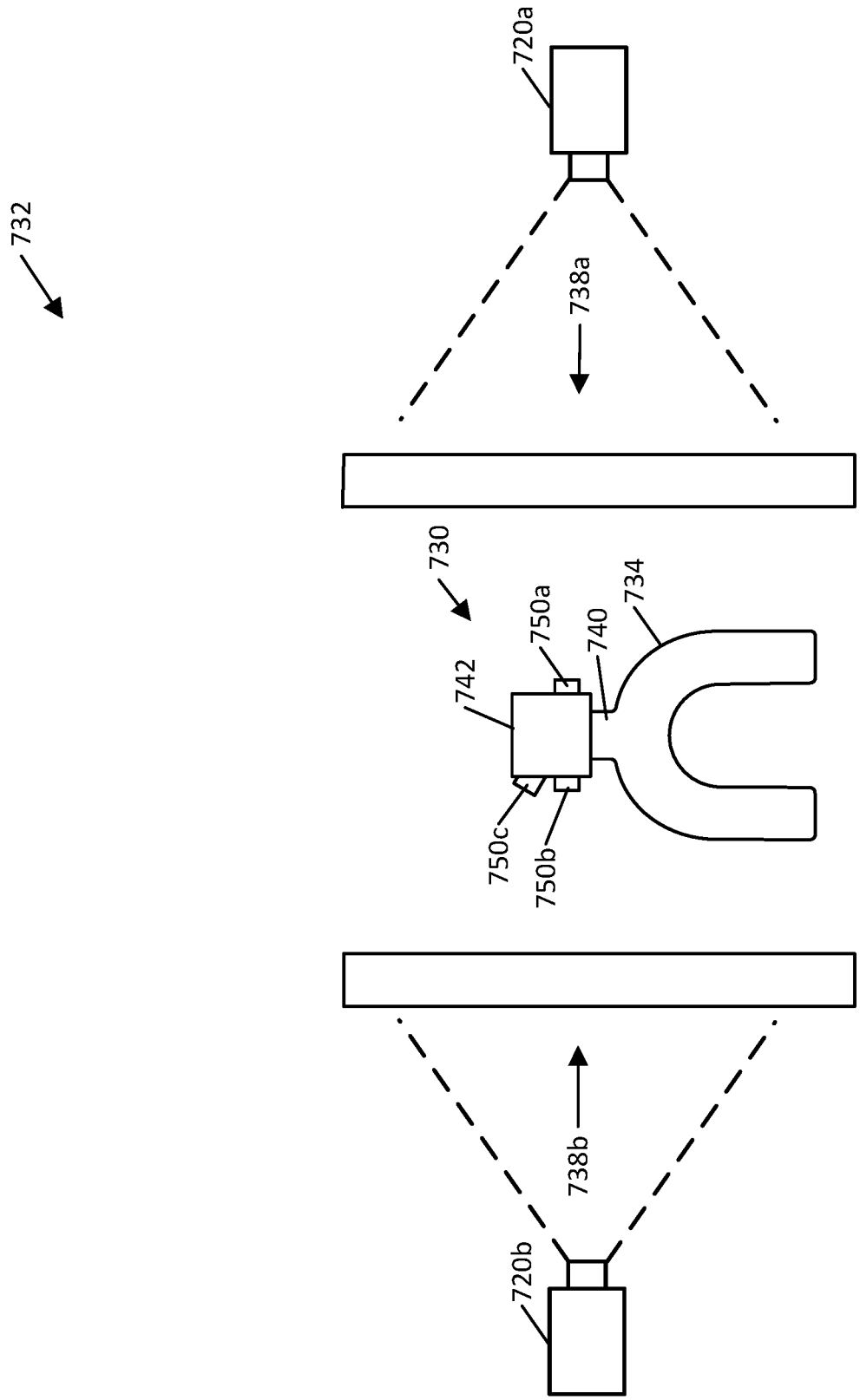
FIG. 7 illustrates a top view of an embodiment of a reference structure of FIG. 3 and an embodiment of the imaging system of FIG. 1.

FIG. 7 illustrates a top view of an embodiment of a reference structure 730 and an embodiment of an imaging system 732. The reference structure 730 is an example of the reference structure 622. The imaging system 732 is an example of the imaging system 602.

The reference structure 730 includes a dentition coupling device 734, an extension member 740, and a light source assembly 742. The dentition coupling device 734 is an example of the dentition coupling device 230 and may be similar to the example dentition coupling devices previously described with respect to embodiments of the clutch. The light source assembly 742 is an example of the position indicator system 234. In this example, the light source assembly 742 includes light emitters 750a, 750b, and 750c (collectively referred to as light emitters 750).

The dentition coupling device 734 is configured to removably couple to the dentition of the patient. The dentition coupling device 734 is coupled to the opposite arch of the patient's dentition as the clutch (e.g., the dentition coupling device 734 of the reference structure 730 couples to the maxillary arch when a clutch is coupled to the mandibular arch). In some embodiments, the dentition coupling device 734 is coupled to the extension member 740 that is configured to extend out through the patient's mouth when the dentition coupling device 734 is coupled to the patient's dentition. The extension member 740 may be similar to the extension member 408.

The imaging system 732 includes screens 738a and 738b (referred to collectively as screens 738), and cameras 720a and 720b (referred to collectively as cameras 720). In this example, the screen 738a is oriented parallel to the screen 738b. In some embodiments, the imaging system 732 may also include a screen framework (not shown) that positions the screens 738 with respect to each other. For example, the screen framework may extend beneath the reference structure 730 and couple to the bottoms of the screens 738. Together, the screens 738 and the screen framework are an example of the screen assembly 212. The cameras 720 are an example of the optical sensing assembly 210.

The screens 738 may be formed from a translucent material so that the points where the light beams emitted by the light source assembly 742 intersect with the screens 738 may be viewed from outside of the screens 738. Images that include these points of intersection may be recorded by the cameras 720. The motion determining device 206 may then analyze these captured images to determine the points of intersection of the light beams with the screens 738 to determine the location of the light source assembly 742. The position of the light source assembly of a clutch (not shown) may be determined in a similar manner.

The cameras 720 are positioned and oriented to capture images of the screens 738. For example, the camera 720a is positioned and oriented to capture images of the screen 738a, and the camera 720b is positioned and oriented to capture images of the screen 738b. In some embodiments, the cameras 720 are mounted to the screen framework so that the position and orientation of the cameras 720 are fixed with respect to the screens. For example, each of the cameras 720 may be coupled to the screen framework by a camera mounting assembly. In this manner, the position and orientation of the cameras 720 relative to the screens 738 does not change if the screen framework is moved. In some implementations, the screen framework includes a housing (e.g., as shown at 610 in FIG. 6), within which the cameras 720 are disposed.

Figure 8:
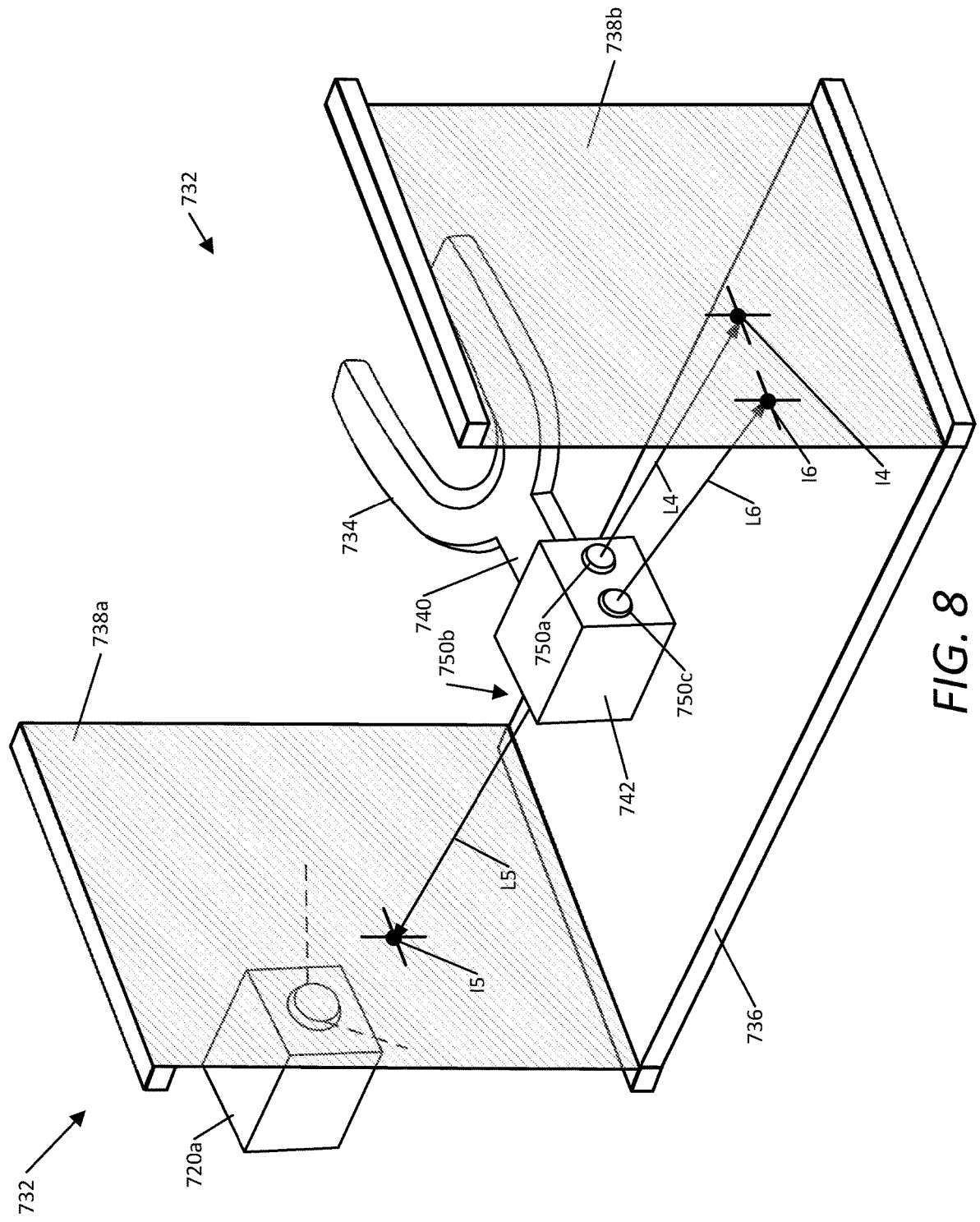
FIG. 8 illustrates a perspective view of the reference structure of FIG. 7 disposed between the screens of the imaging system of FIG. 7.

FIG. 8 illustrates a perspective view of the reference structure 730 disposed between the screens 738 of the imaging system 732. The screens 738 are joined together by a screen framework 736 that positions and orients the screens 738 with respect to one another. In this example, the light emitter 750a is emitting a light beam L4, which intersects with the screen 738b at intersection point I4; the light emitter 750b is emitting a light beam L5, which intersects with the screen 738a at intersection point I5; and the light emitter 750c is emitting a light beam L6, which intersects with the screen 738a at intersection point I6. As the position and orientation of the reference structure 730 change relative to the screens 738, the locations of at least some of the intersection points I4, I5, and I6 will change as well.

The camera 720a captures images of the screen 738a, including the intersection point I5 of the light beam L5 emitted by the light emitter 750b. The camera 720a may capture a video stream of these images. Similarly, although not shown in this illustration, the camera 720b captures images of the screens 738b and the intersection points I4 and I6.

The captured images from the cameras 720 are then transmitted to the motion determining device 206. The motion determining device 206 may determine the location of the intersection points I4, I5, and I6, and from those points the location of the light source assembly 742. In some embodiments, a point of common intersection for the light beams L4, L5, and L6 is determined based on the location of the intersection points I4, I5, and I6 (e.g., the point at which the light beams intersect or would intersect if extended). Based on the determined locations of the light beams, the location and orientation of the reference structure 730 relative to the screens 738 can be determined.

Figure 9:
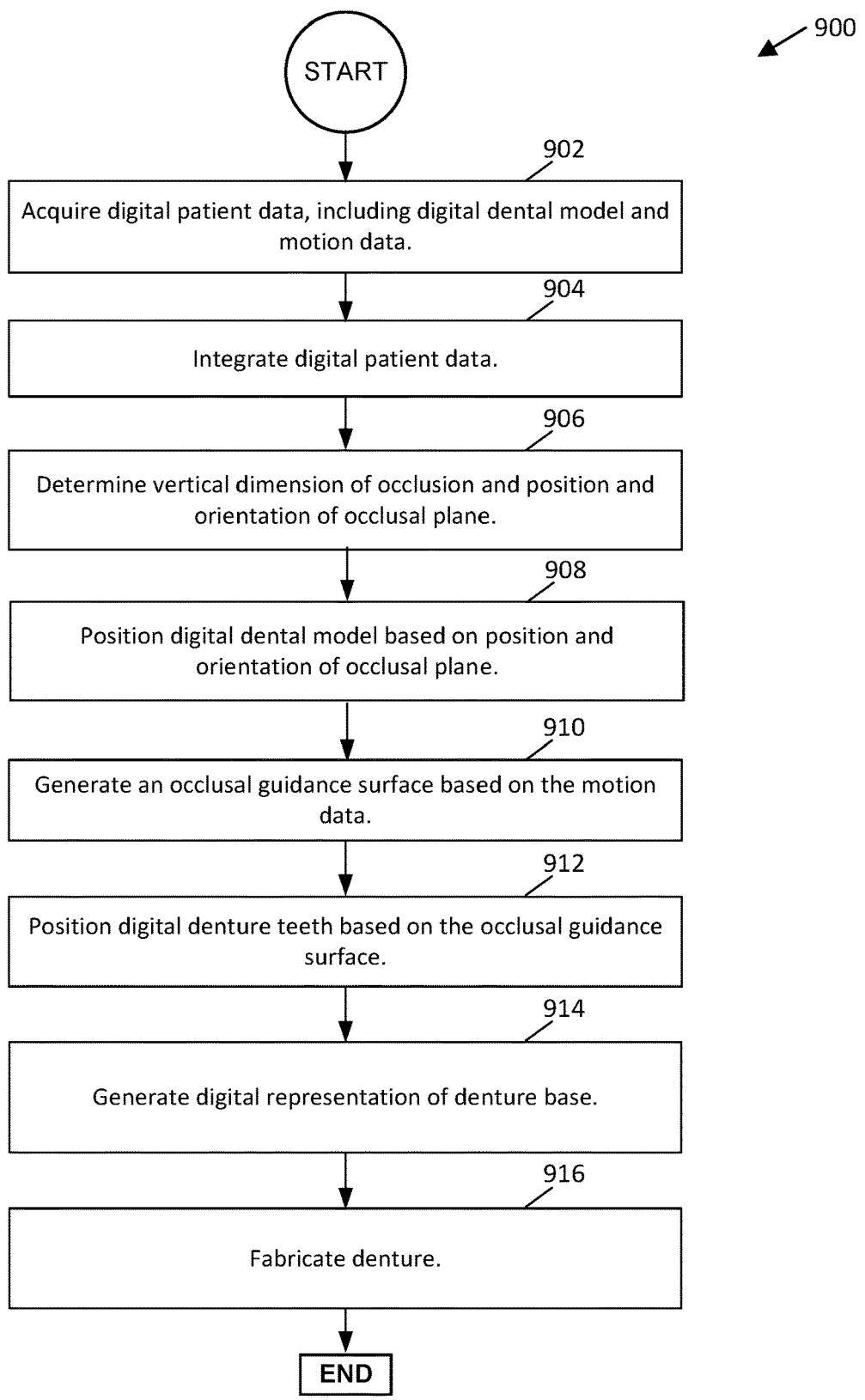
FIG. 9 is a flowchart of an example process for fabricating a denture based on motion data.

FIG. 9 is a flowchart of an example process 900 for fabricating a denture based on motion data. In some embodiments, the process 900 is performed by the system 100.

At operation 902, digital patient data, including motion data and a digital dental model, is acquired. For example, the digital patient data may include imaging data of the patient dentition. The imaging data may be captured using various imaging modalities. In some implementations, the imaging data includes a three-dimensional digital dental model of the patient's dentition. The three-dimensional digital dental model may be captured using an intraoral scanner. The three-dimensional digital dental model may be captured by scanning a physical impression or mold formed from a physical impression using a three-dimensional scanner.

The acquired digital patient data may also include motion data of the patient's jaw. For example, the motion data may be captured using the motion capture system 200. The motion data may represent the patient's jaw moving through various jaw movements including, for example, excursive movements and protrusive movements. The motion data may also represent that patient's jaw position and movement as the patient pronounces specific phonetic sounds such as the "F" sound and the "S" sound. In some implementations, audio or video files may be captured as the patient pronounces the specific sounds. The motion data may map to frames or positions in the video or audio data. Based on sound processing (e.g., audio signal processing) of the audio data or image processing of the video data, various positions in the patient's speech may be identified and the corresponding frame of the motion data may be identified.

The acquired digital patient data may also include one or more anterior facial images of the patient. The anterior facial images may include two-dimensional images or three-dimensional images. In some implementations, the anterior facial images include an image of the patient smiling and an image of the patient with lips in repose (e.g., relaxed). The anterior facial images may also include videos. For example, the videos may include video of the patient performing various jaw movements such as excursive movements and protrusive movements. The videos may also include video of the patient pronouncing specific phonetic sounds such as sibilants (e.g., the "S" sound) or fricatives (e.g., the "F" sound).

The acquired digital patient data may also include other types of patient images captured using imaging modalities such as computed tomography (CT), including cone beam computed tomography (CBCT), ultrasound, and magnetic resonance imaging (MRI).

At operation 904, the digital patient data is integrated. For example, the digital patient data may be integrated to a common coordinate system (e.g., positioned relative to the same XYZ axes). Different types of digital patient data may be integrated using different techniques. For example, three-dimensional data sets may be integrated using for example an iterative alignment process such as an iterative closest point technique. In some embodiments, multiple types of the digital patient data include fiducial markers. The positions of the fiducial markers may be determined from the digital patient data and used to align one set of digital patient data with another.

In some implementations, the digital patient data includes two-dimensional images captured with a camera of the image capture system 107. A polygon may be generated within the common coordinate system. The two-dimensional images may be mapped to the polygon.

At operation 906, a vertical dimension of occlusion and an occlusal plane position and orientation is determined for the patient. The determined vertical dimension of occlusion indicates the desired position of the patient's mandible and maxilla when the patient's jaw is at rest. The vertical dimension of occlusion may correspond to a total distance between edentulous ridges to accommodate dentures with a desired amount of occlusal open space when the patient is at rest. The vertical dimension of occlusion influences the function, comfort, and aesthetics of dentures. The determined occlusal plane may correspond to a plane disposed between the patient's maxilla and mandible that approximately corresponds to where the occlusal surfaces of the patient's teeth meet. The occlusal plane may, for example, be positioned at a desired location of the incisal edge of the patient's upper central incisors, which may be determined from photos of the patient or using a gothic arch tracer. The occlusal plane may be oriented based on the motion data. Although often referred to as an occlusal plane in the denture and dental fields, the occlusal plane need not be precisely planar and may vary from a plane to follow the curve of the patient's lips.

In some implementations, the vertical dimension of occlusion may be specified by a care provider such as dentist or physician. The vertical dimension of occlusion may also be determined based, at least in part, on motion data of the digital patient data. For example, motion data while the patient is pronouncing specific sounds such as sibilants (e.g., the "S" sound) or fricatives (e.g., the "F" sound). A desired vertical dimension of occlusion may be determined from the relative positions of the maxilla and mandible as the sounds are pronounced. The vertical dimension of occlusion may also be determined from a two-dimensional facial image of the digital patient data.

The occlusal plane may, for example, be determined based on applying a ratio to the vertical dimension of occlusion. In some implementations, the occlusal plane may be determined based on the two-dimensional facial image of the digital patient data. For example, the occlusal plane may be positioned so as to align the incisal edges of the upper central incisors with respect to the patient's lips.

At operation 908, the digital dental model of the digital patient data is positioned based on the position and orientation of the occlusal plane. For example, a portion of the digital dental model representing the mandibular dental arch may be positioned based on the motion data so as to be positioned at the determined vertical dimension with respect to the maxillary dental arch and so that the denture teeth on the mandibular arch align with the occlusal plane. In some implementations, a frame of the motion data that positions the mandibular dental arch at the determined vertical dimension is identified. In some implementations, the mandibular dental arch is rotated about a hinge axis to open to the determined vertical dimension of occlusion. The position of the hinge axis may be inferred based on the motion data.

In some implementations, the denture design system 116 includes a user interface that displays the digital dental model, the occlusal plane, or both. The user interface may be configured to receive user input to adjust the vertical dimension of occlusion or the position of the occlusal plane. For example, the user interface may be configured to receive a drag (e.g., click-and-drag or touch-and-drag) input to interactively move the mandibular arch of the digital dental model up or down along an arch defined by the motion data or a hinge axis inferred from the motion data. Similarly, the user interface may be configured to interactively move the occlusal plane along the arch between the mandibular arch and maxillary arch of the digital dental model.

Figure 10:
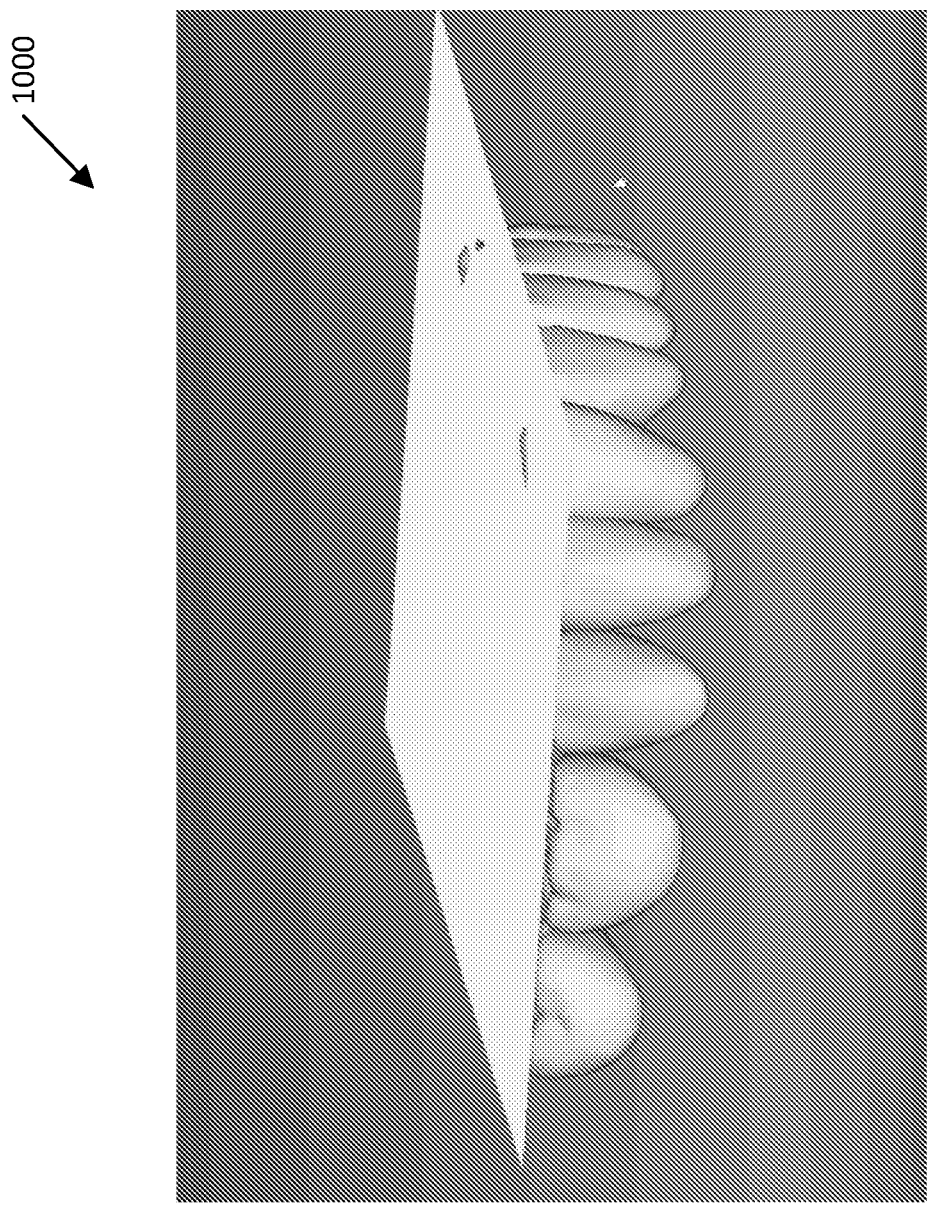
FIG. 10 includes an example user interface screen that may be generated by the denture design system of FIG. 1.

FIG. 10 includes an example user interface screen 1000 that may be generated by the denture design system 116 to display an example occlusal plane in relation to example mandibular dentition. In this example, the occlusal plane is highlighted, indicating that it is selected and that a user may provide input to reposition the plane. For example, the user interface may allow a user to drag the occlusal plane up or down. In some implementations, the digital denture teeth may move with the occlusal plane. In some implementations, the occlusal plane may be adjusted independently of the digital denture teeth. The user interface may be configured to accept one or more inputs (e.g., a button or menu actuation) to cause the digital denture teeth to move (or snap) to the occlusal plane. In at least some implementations, the occlusal plane may be displayed with respect to one arch, while the digital denture teeth of the other arch move with the occlusal plane.

Returning now to FIG. 9, at operation 910, an occlusal guidance surface is generated based on the motion data. The occlusal guidance surface may be used to guide the positioning of denture teeth on one of the dental arches. The occlusal guidance surface may be generated for one or both of the mandibular arch and the maxillary arch.

In some implementations, the occlusal guidance surface is generated for a dental arch by sweeping (or moving) at least a portion of the opposing dental arch according to the motion data. For example, a portion of the opposing dental arch may be swept through one or more of excursive and protrusive movements based on the motion data. In some implementations, the portion of the opposing dental arch may be swept through all of the movements represented in the motion data.

In some implementations, a midline polyline segment may be swept according to the motion data. The midline polyline segment may be a cross-section of the opposing dentition at the midline (e.g., middle of the dental arch). The cross-section may be generated by slicing or intersecting a vertically oriented plane through the opposing dentition.

In some implementations, the midline polyline segment is not directly based on the opposing dentition. For example, the midline polyline segment may be a line segment on the occlusal plane that extends in the anterior-posterior direction at the midline.

As the portion of the opposing dentition is swept according to the motion data, the occlusal guidance surface is generated. For example, a midline polyline segment may be duplicated in multiple locations according to the motion data (e.g., the midline polyline segment may be duplicated every 25 micron, every 50 microns, every 100 microns, or another distance). The adjacent midline polyline segments may then be joined to form a surface.

In some implementations, a polygonal surface may be deformed based on the swept midline polyline segment. For example, the polygonal surface may initially be a flat surface that is positioned at the determined occlusal plane location. As the midline polyline segment is swept through different locations, the polygonal surface may be deformed vertically to the midline polyline segment.

At operation 912, digital denture teeth are positioned based on the occlusal guidance surface. The digital denture teeth may be loaded from a library of digital denture teeth. Some implementations include multiple libraries of denture teeth. The digital denture teeth libraries may vary functionally, aesthetically, or based on manufacturer.

In some implementations, the digital denture teeth may include labels for anatomical landmarks such as cusps, marginal ridges, incisal edges, fossa, grooves, base boundaries, or other anatomical landmarks. These labels may be used to automatically position the digital denture teeth with respect to one another and digital denture teeth on the opposing dentition.

Figure 11:
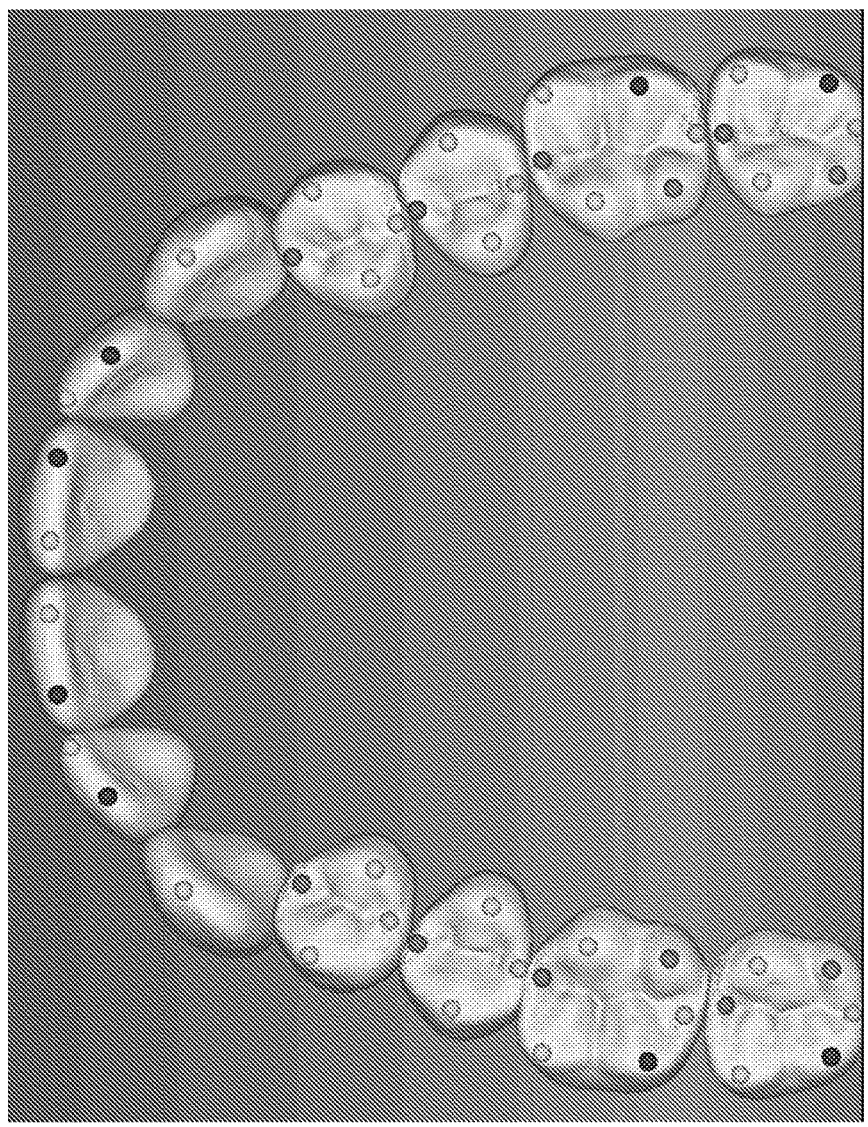
FIG. 11 includes an example user interface screen that may be generated by the denture design system of FIG. 1.

FIG. 11 includes an example user interface screen 1100 that may be generated by the denture design system 116 to display digital denture teeth with example labels for various anatomical landmarks. In this example, the labels are displayed as spherical markers overlayed on the digital denture teeth at the locations of the anatomical landmarks. Different types of anatomical landmarks may be shown with different visual characteristics. Here, different types of anatomical landmarks are shaded differently (e.g., using different colors or shading characteristics). In some implementations, different types of anatomical landmarks may be shown using different textures. In this example, different label characteristics are used for the mesial-labial cusp tips (or mesial end of the incisal edge, depending on the tooth), distal-labial cusp tips (or distal end of the incisal edge, depending on the tooth), the mesial-lingual cusp tips, the distal-lingual cusp tips, the mesial end of the central fossa, and the distal end of the central fossa.

Returning now to FIG. 9, the digital denture teeth may be initially positioned in alignment with an arch curve. The arch curve may be sized and shaped based on the digital dental model. Each of the digital denture teeth may include one or more labels that specify one or more locations on the digital denture teeth to align to the arch curve. The digital denture teeth may also be associated with a tip and torque with respect to one or more of the arch curve and the occlusal plane. When initially positioned, the digital denture teeth may be positioned based with respect to the arch curve based on the labels and automatically tipped and torqued with respect to the arch curve based on the associated values.

Figure 12:
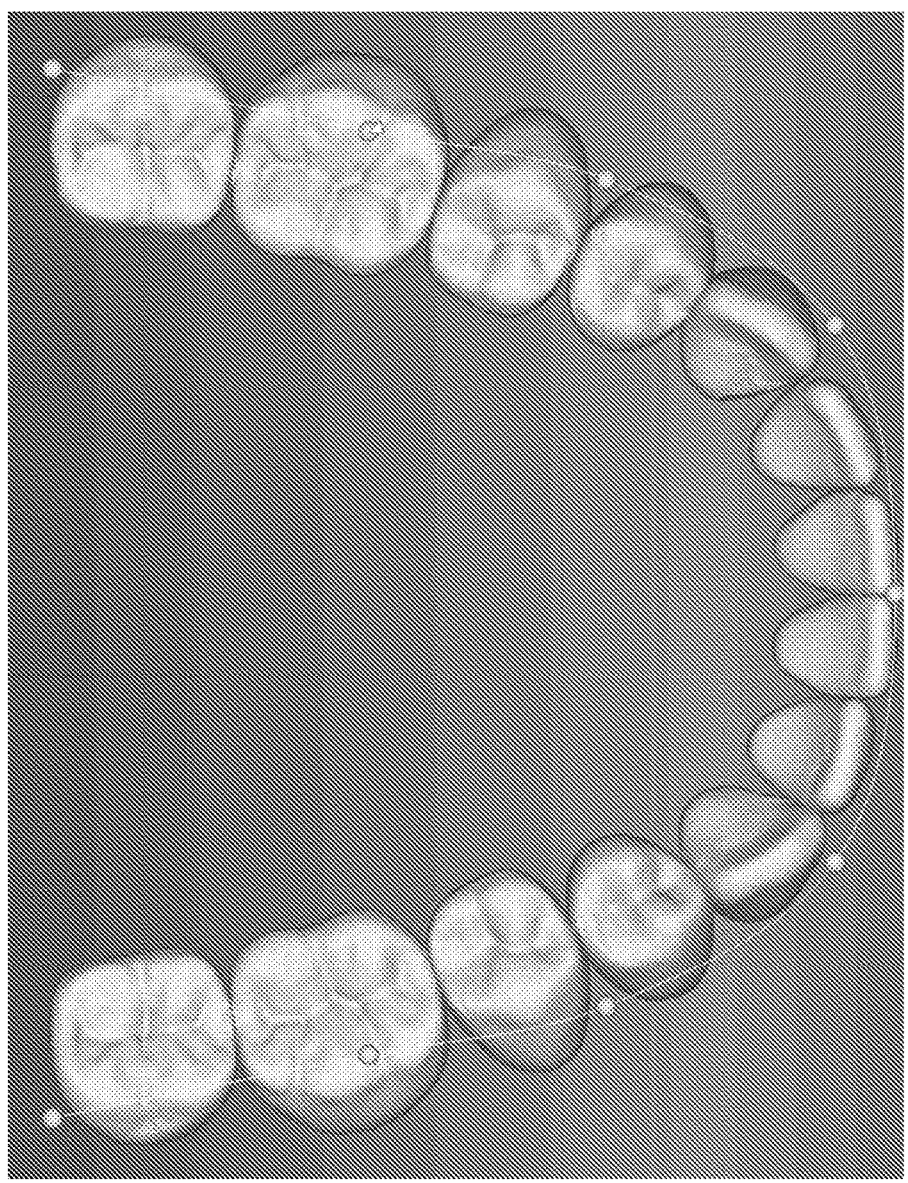
FIG. 12 includes an example user interface screen that may be generated by the denture design system of FIG. 1.

FIG. 12 includes an example user interface screen 1200 that may be generated by the denture design system 116 to display digital denture teeth and an example arch curve. The example arch may be used to initially position the digital denture teeth. Here, the arch curve is a spline curve shown with control points. The control points are shown as spheres. In some implementations, the user interface accepts inputs to change the positions of the control points (e.g., a drag may reposition a selected control point) and adjusts the shape of the arch curve accordingly. In some implementations, the digital denture teeth are repositioned as the arch curve changes. In some implementations, the arch curve may be adjusted independently of the digital denture teeth. The user interface may be configured to accept one or more inputs (e.g., a button or menu actuation) to cause the digital denture teeth to re-align to the arch curve.

Figure 13:
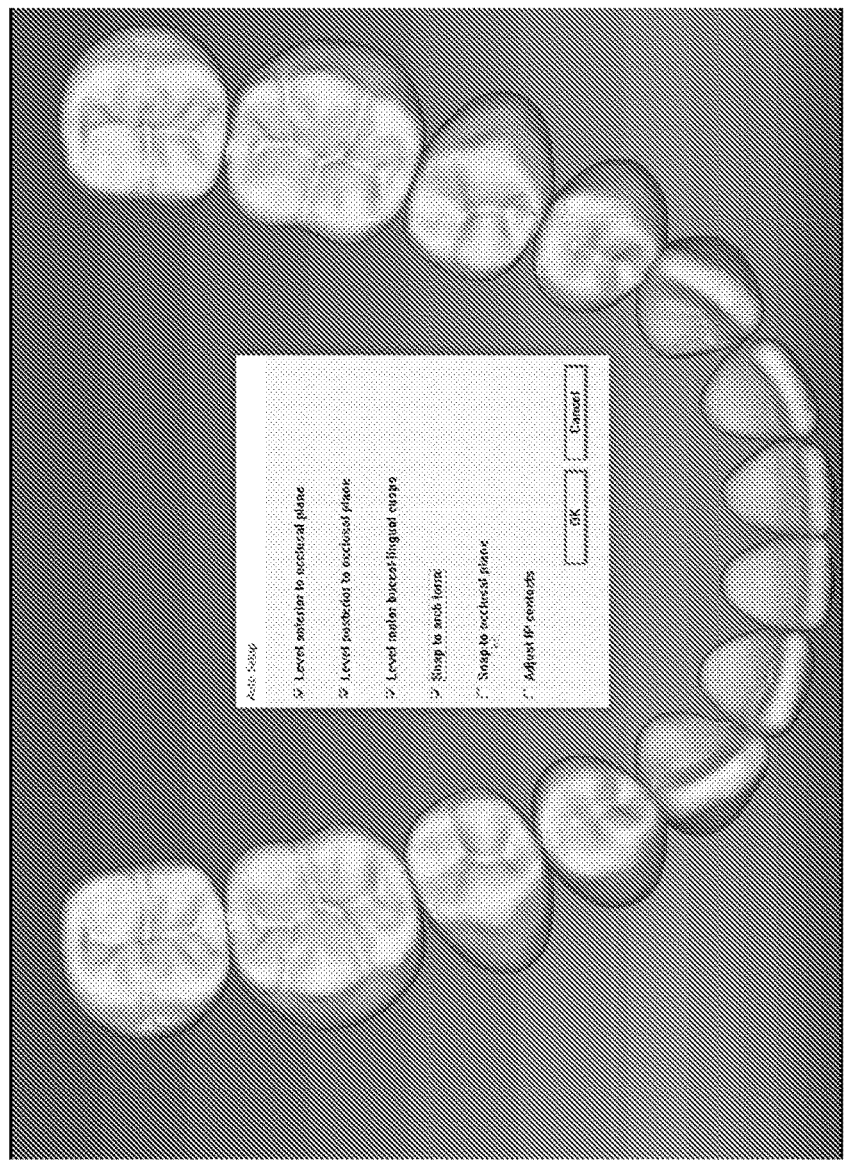
FIG. 13 includes an example user interface screen that may be generated by the denture design system of FIG. 1.

FIG. 13 includes an example user interface screen 1300 that may be generated by the denture design system 116 to allow a user to adjust settings to automatically setup (position) digital denture teeth. In this example, a dialog box is displayed that has checkboxes to control how the digital denture teeth are automatically positioned. In this example, the dialog box includes checkboxes for "level anterior to occlusal plane", "level posterior to occlusal plane", "level molar buccal-lingual cusps", "snap to arch form", "snap to occlusal plane", and "adjust IP contacts". A user may select one or more of the checkboxes and then upon clicking the "OK" button, the digital denture teeth will be repositioned accordingly.

In some implementations, the digital denture teeth may be aligned to the occlusal guidance surface. For example, the cusp tips and incisal edges may be aligned to the occlusal guidance surface.

In some implementations, the digital denture teeth for at least a first dental arch are positioned according to the arch curve and the occlusal plane or occlusal guidance surface. The opposing dentition may then be aligned based on the positions of the digital denture teeth of the first arch. For example, the labels of the anatomical landmarks may be used to align the digital denture teeth of the opposing dentition with the digital denture teeth of the first dental arch (e.g., cusp tips in contact with opposing fossa). The digital denture teeth may also be positioned to achieve a desired overjet/overbite relationship. In some implementations, the digital denture teeth of the lower dentition may be positioned first based on the arch curve and occlusal guidance surface and the digital denture teeth of the upper dentition are then placed based on the lower dentition.

Figure 14:
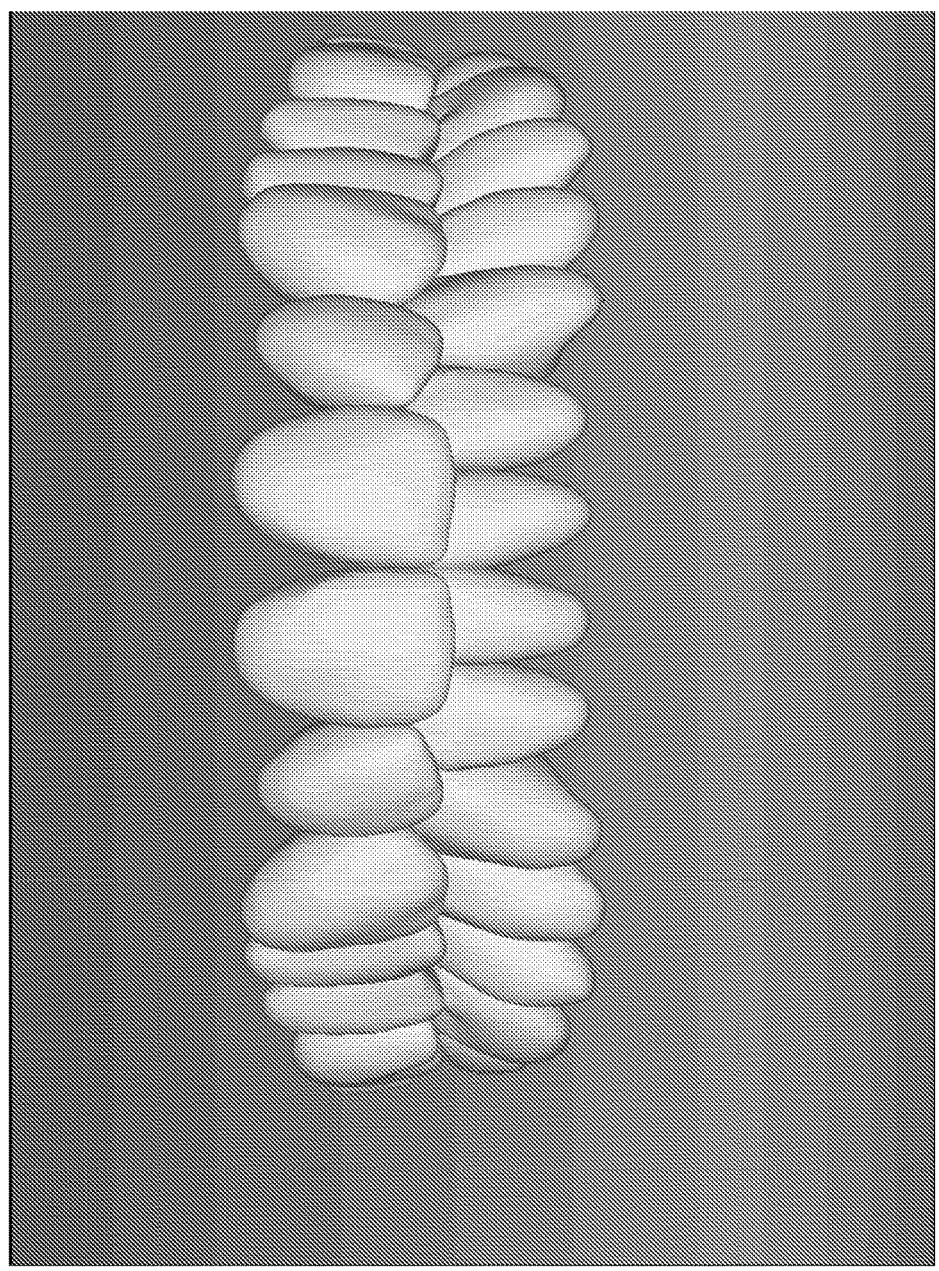
FIG. 14 includes an example user interface screen that may be generated by the denture design system of FIG. 1.

FIG. 14 includes an example user interface screen 1400 that may be generated by the denture design system 116 to show a complete set of digital denture teeth. As described previously, the digital denture teeth of one of the arches (e.g., the lower arch) may be positioned based on one or more of an arch curve, an occlusal plane, or an occlusal guidance surface. The digital denture teeth of the other arch (e.g., the upper arch) may then be positioned based on the positions of the digital denture teeth of the first arch.

Once the digital denture teeth are in their initial positions, their positions may be further refined. For example, some implementations include a user interface that is configured to receive user input to adjust the positions of one or more of the digital denture teeth.

Figure 15:
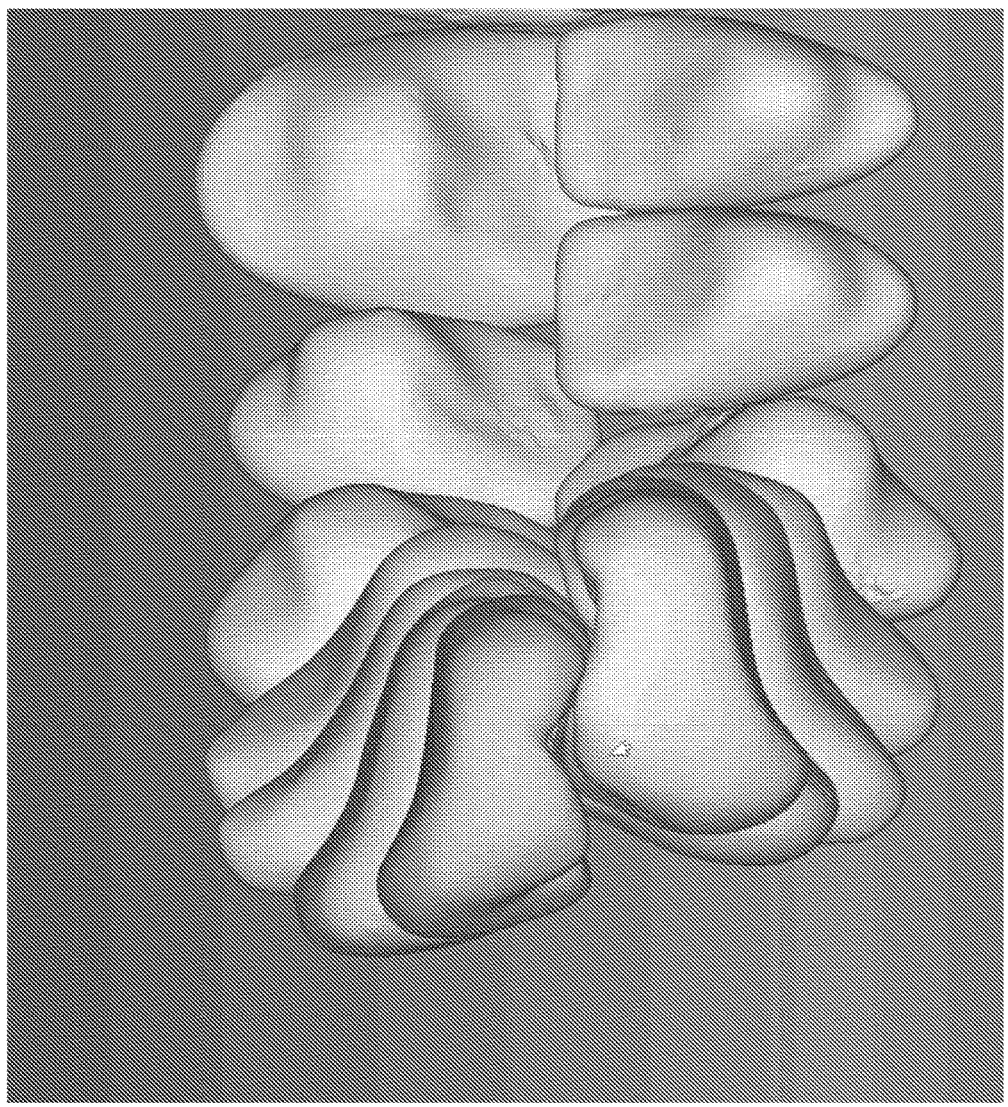
FIG. 15 includes an example user interface screen that may be generated by the denture design system of FIG. 1.

FIG. 15 includes an example user interface screen 1500 that may be generated by the denture design system 116 to receive user input to reposition a digital denture tooth. In this example, a user has selected one of the digital denture teeth (an upper molar). The user may, for example, select a digital denture tooth by using a mouse to click on the representation of the digital denture tooth. In some implementations, the user may select a digital denture tooth by touching a touchscreen. The selected digital denture tooth may be displayed using different coloring or shading than the other digital denture teeth.

The user interface may then receive a user input to move the selected digital denture tooth. In some implementations, the user input is a drag input such as a click-and-drag or touch-and-drag. Based on the direction of the drag, the digital denture tooth may move in a corresponding direction. In some implementations, the movement may be in a direction that is parallel to the occlusal plane.

In some implementations, as the digital denture tooth moves based on the drag input, the digital denture tooth also moves in the occlusal-gingival direction to make contact with the opposing dentition. In some implementations, the digital denture tooth may move to contact with an occlusal guidance surface that is generated based on the opposing denture teeth and the motion data (e.g., by sweeping the opposing denture teeth through the motion of the motion data). Beneficially, in these embodiments, the digital denture teeth remain in contact as they are positioned, potentially increasing efficiency for both a user and a computing device in positioning the digital denture teeth. For example, fewer processing cycles may be used to automatically move a tooth into contact than would be used to generate a user interface and receive user inputs to position the digital denture tooth in contact. Another benefit of automatically moving the digital denture tooth into contact is that the resulting arrangement of digital denture teeth may be more consistently of high quality than an arrangement where each digital denture tooth is moved into contact by a user. In some implementations, multiple digital denture teeth may be selected and moved together.

Figure 16:
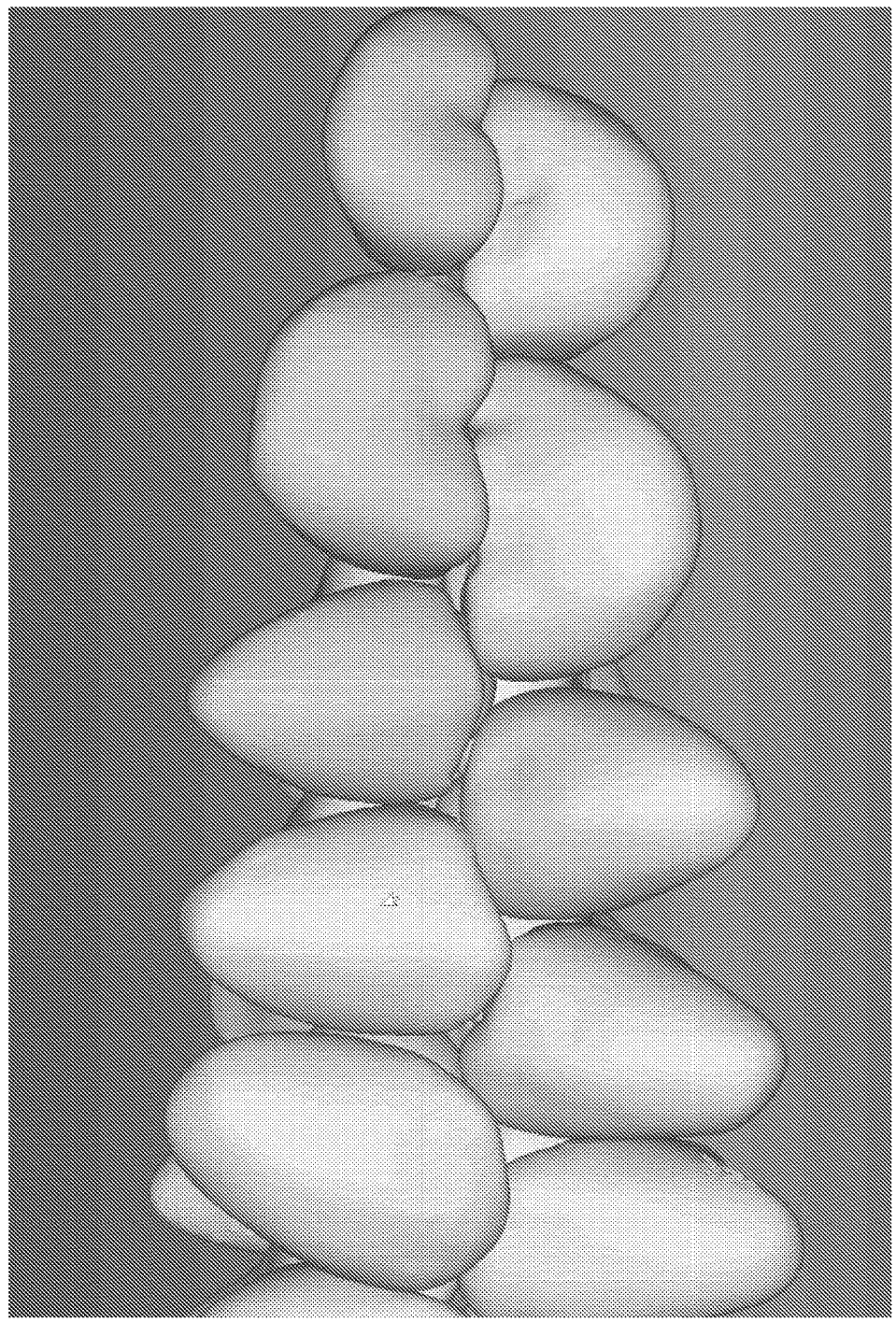
FIG. 16 includes an example user interface screen that may be generated by the denture design system of FIG. 1.

FIG. 16 includes an example user interface screen 1600 that may be generated by the denture design system 116 to receive user input to reposition multiple digital denture teeth. In this example, three digital denture teeth are selected and are being repositioned. As the digital denture teeth are moved in response to user input, they are each individually moved into contact with the opposing dentition. For example, here, the three selected digital denture teeth may be moved in the distal direction. As they move, they will each move in the gingival or occlusal direction to maintain occlusal contact with the opposing dentition while avoiding interference (e.g., overlap or collision of the digital denture teeth). For example, these tools may be used to rotate and reposition the upper digital denture teeth into a bilaterally balanced, lingualized occlusion (e.g., by rotating the upper teeth so that the buccal cusps are oriented further in the buccal direction).

Figure 17:
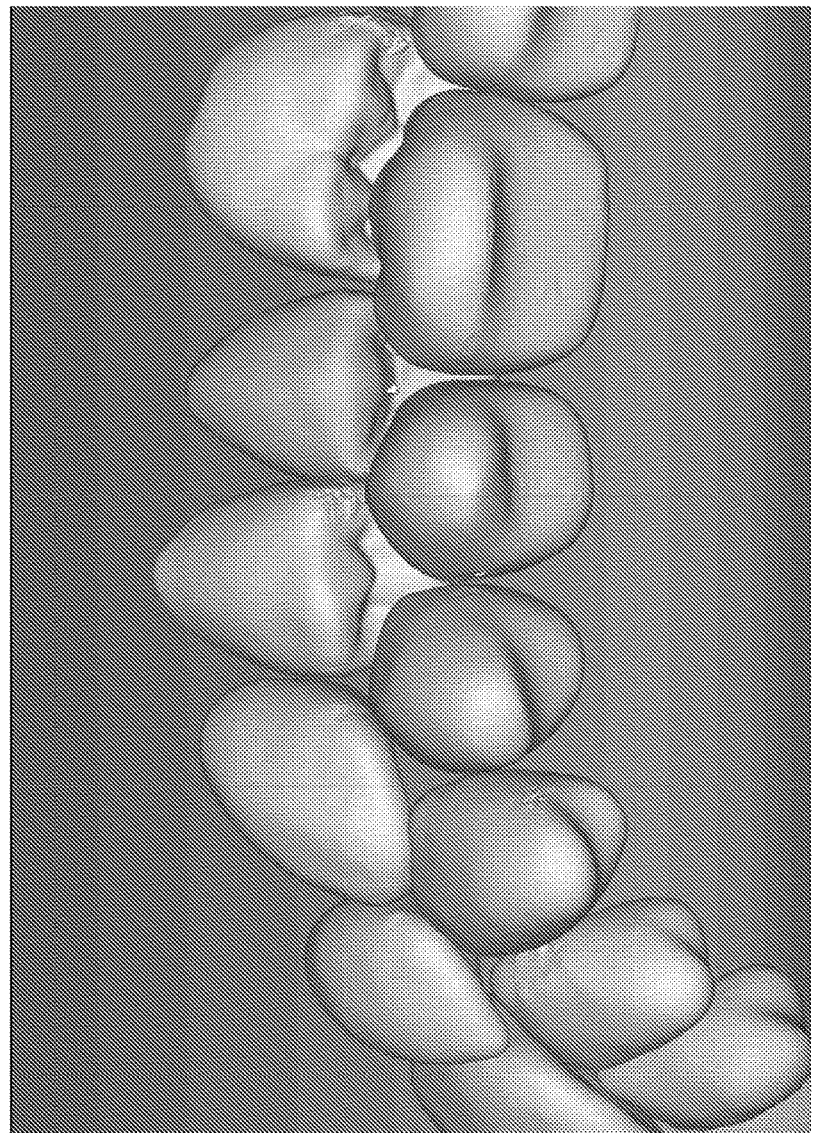
FIG. 17 includes an example user interface screen that may be generated by the denture design system of FIG. 1.

FIG. 17 includes an example user interface screen 1700 that may be generated by the denture design system 116 to receive user input to reposition a digital denture tooth. In this example, a user has selected one of the digital denture teeth (an upper bicuspid). A user may provide user input to cause the selected digital denture tooth to move in the mesial or distal direction. In this example, the software application detects contact with the adjacent digital denture teeth and prevents further movement of the selected digital denture tooth.

Figure 18:
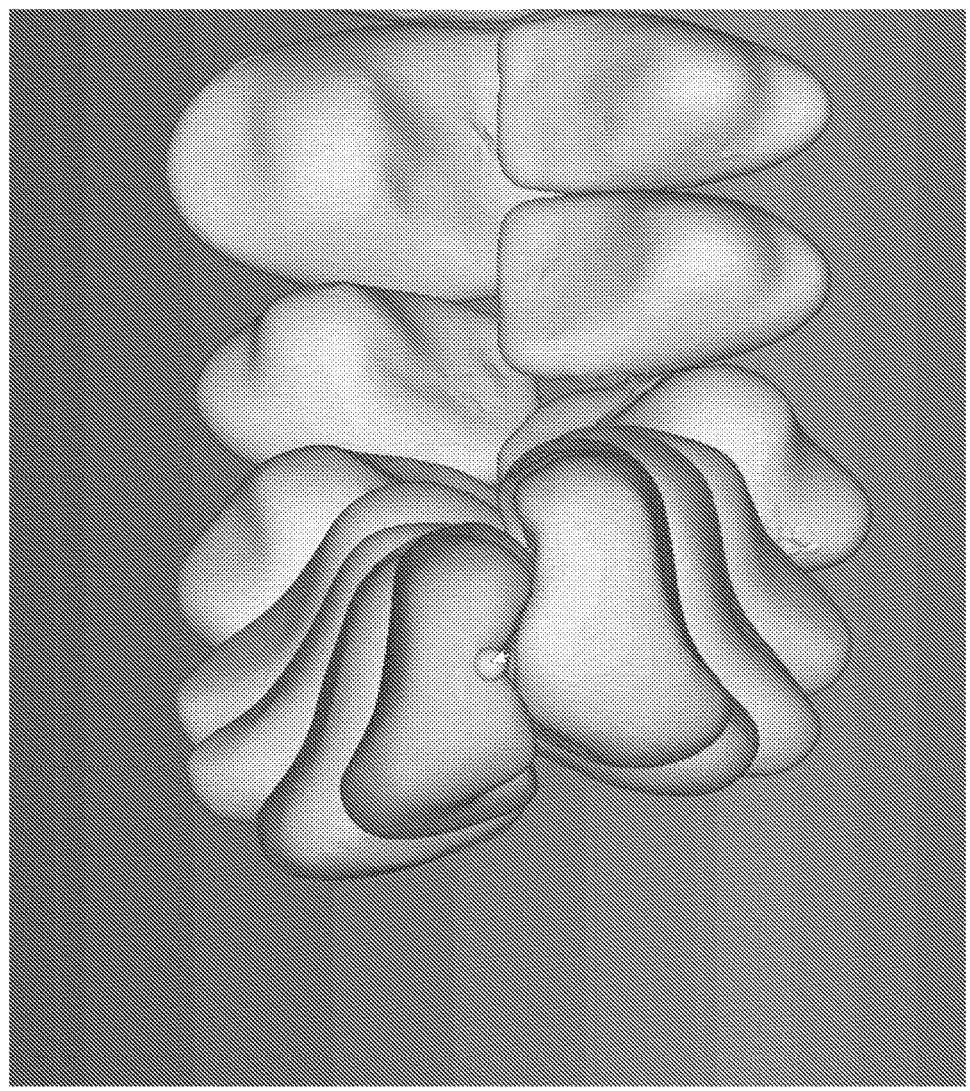
FIG. 18 includes an example user interface screen that may be generated by the denture design system of FIG. 1.

FIG. 18 includes an example user interface screen 1800 that may be generated by the denture design system 116 to receive user input to reposition a digital denture tooth. In this example, a user has selected one of the digital denture teeth (an upper molar). In this example, the user interface is configured to allow the user to rotate the selected digital denture tooth. Here, the digital denture tooth is being rotated about an axis that is represented on the user interface by a sphere. As the digital denture tooth rotates, it is automatically moved in the occlusal or gingival direction to maintain contact and avoid overlap with the opposing dentition.

In some implementations, the user interface may allow a user to iterate through the techniques for positioning digital denture teeth repeatedly and in any order.

Returning now to FIG. 9, at operation 914, a digital representation of a denture base is generated. In some implementations, a soft-tissue boundary curve is generated based on the digital dental model. The soft-tissue boundary curve represents the edge of the denture base. The soft-tissue boundary curve may surround the edentulous ridge. The soft-tissue boundary curve may be represented by a spline curve. Some implementations include a user interface through which a user may adjust the spline curve.

A soft-tissue interface surface may be generated based on the soft-tissue boundary curve and the digital dental model. For example, a portion of the digital dental model that is enclosed by the soft-tissue boundary curve may be offset (e.g., by 10 microns, 25 microns, 50 microns, 100 microns, or another amount) to form the soft-tissue interface surface. The soft-tissue interface surface may be an intaglio surface (i.e., the surface of the denture that touches the gum tissue). On upper dentures, the intaglio surface may be a posterior palatal seal. The offset may provide space for a dental adhesive that can secure the denture, when fabricated, to the patient's edentulous ridge. Some implementations are configured to fit to the patient's edentulous ridge via suction or friction. In these embodiments, the soft tissue interface surface may not be offset from the digital dental model.

Tooth boundary curves may be identified for each of the positioned digital denture teeth. The tooth boundary curves may be identified based, for example, on labels stored with each of the digital denture teeth that identify the portion of the tooth that should be embedded in the denture base. A surface may be formed to join the outer edges of the tooth boundary curves to the soft-tissue interface surface. Sockets may be generated within the boundary curves. The sockets may be shaped to receive the denture teeth.

At operation 916, the denture is fabricated. For example, the denture base may be fabricated based on the digital representation. The denture base may be fabricated using a rapid fabrication technology such as three-dimensional printing or computer numerically controlled (CNC) milling. For example, the denture base may be fabricated from acrylic or another biocompatible material. The denture base may be made from a material that has aesthetic properties that substantially match gum tissue. In some implementations, pre-manufactured denture teeth that match the digital denture teeth library are placed and bonded into the sockets of the denture base.

The denture teeth may also be manufactured using rapid fabrication technology. For example, the denture teeth may be fabricated using a three-dimensional printer or a CNC mill. The denture teeth may be formed from a biocompatible material that has aesthetic properties that are similar to the aesthetic properties of teeth. In some implementations, the digital denture teeth and the denture base are printed as a single unit by a mixed material three-dimensional printer. In some implementations, one or both of the denture base and the denture teeth are cast using a wax casting process using a pattern fabricated by a three-dimensional printer of CNC mill.

In some implementations, interferences between the digital denture teeth are identified by moving the dental arches according to the motion data. In implementations that use rapid fabrication technology to fabricate denture teeth, the digital models of the denture teeth may be adjusted to remove portions of the digital denture teeth models that would interfere before the denture teeth are fabricated. In implementations that place pre-manufactured denture teeth from a library into the denture base, a CNC mill may be used to remove interfering regions of the pre-manufactured denture teeth after they are placed in the denture base.

Figure 19:
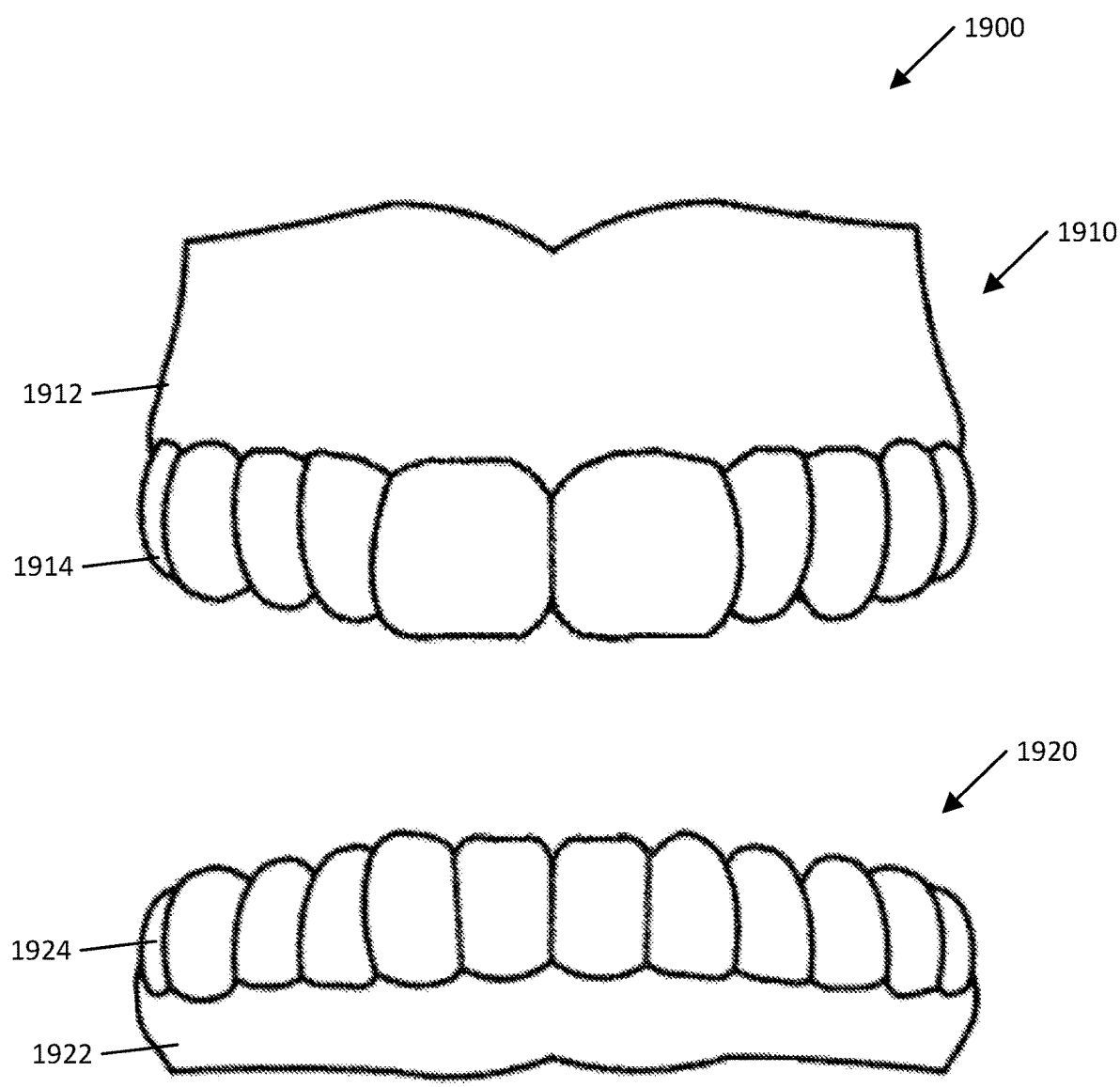
FIG. 19 is a schematic diagram of an example set of motion-based dentures according to embodiments described herein.

FIG. 19 is a schematic diagram of an example set of motion-based dentures 1900. The motion-based dentures 1900 are an example of the dentures 124. The motion-based dentures 1900 are generated based on motion data captured for a patient using, for example, the motion capture system 200. The motion-based dentures 1900 may be fabricated by the process 900.

In this example the motion-based dentures 1900 are complete dentures and include a maxillary denture 1910 and a mandibular denture 1920. The maxillary denture 1910 is shaped to be worn on a maxillary dental arch. The mandibular denture 1920 is shaped to be worn on a mandibular dental arch.

The maxillary denture 1910 includes a maxillary denture base 1912 and maxillary denture teeth 1914. The mandibular denture 1920 includes a mandibular denture base 1922 and mandibular denture teeth 1924.

Figure 20:
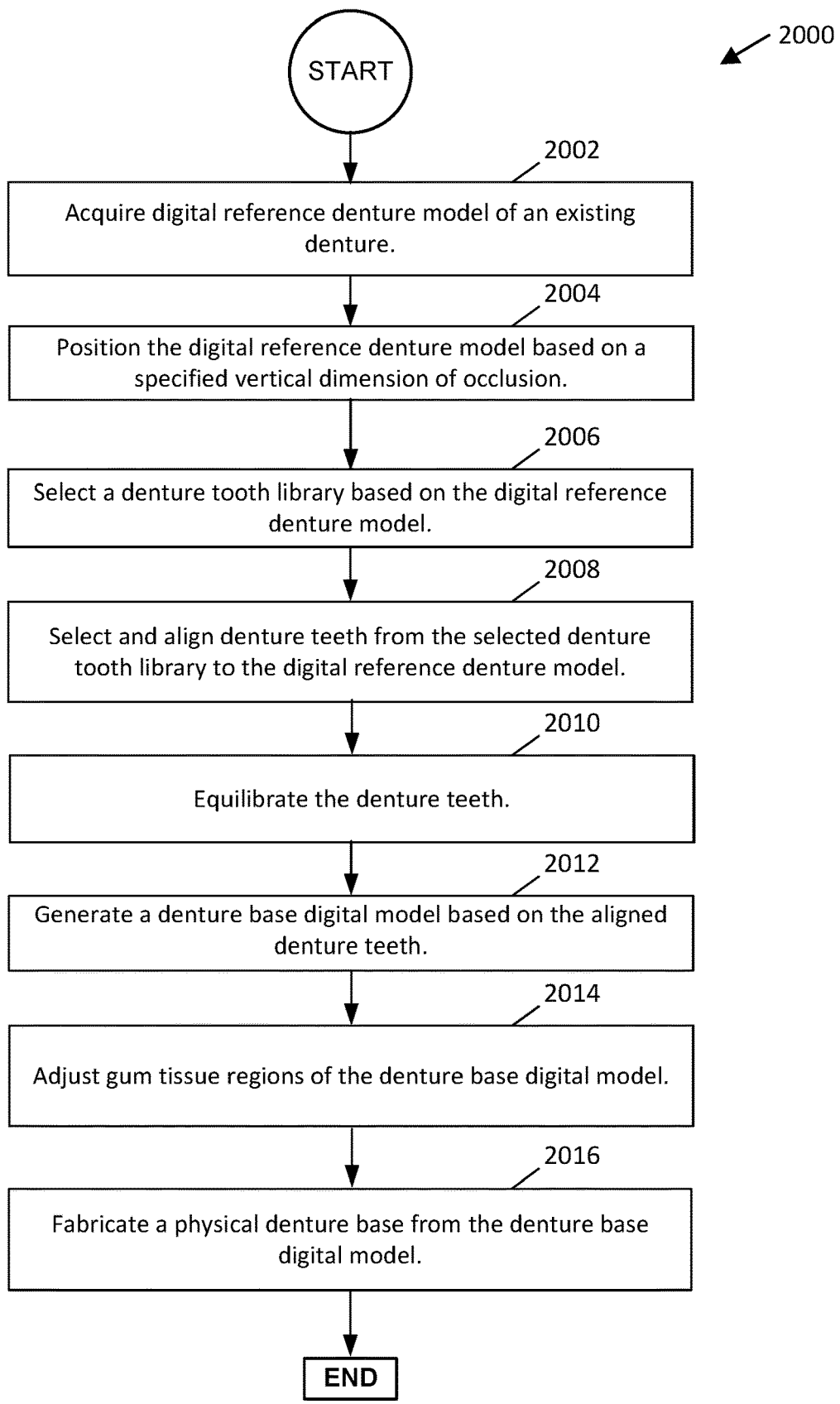
FIG. 20 is a flowchart of an example process for fabricating a replacement denture according to embodiments described herein.

FIG. 20 is a flowchart of an example process 2000 for fabricating a replacement denture based on an existing denture (also referred to as a reference denture). In some embodiments, the process 2000 is performed by the system 100. The process of making a replacement denture may be referred to as a denture remake in the dental field.

Replacement dentures may be needed for several reasons. For example, the denture teeth in a reference denture may be damaged, stained, or lost over time. Additionally, the acrylic base of a reference denture may become damaged or stained over time.

The patient or doctor may desire that the teeth and arrangement of teeth in a replacement denture be similar to the reference denture. It may be difficult and time consuming, however, to provide similar denture teeth and a similar arrangement of denture teeth using conventional techniques for fabricating replacement dentures. For example, neither the patient nor dentist may know which type of denture teeth (e.g., which library of denture teeth) were used in fabricating the reference denture (e.g., due to a patient changing dentists or records being lost).

Additionally, traditional techniques for replicating the shape of the denture base of a reference denture may be time consuming, imprecise, and use significant amounts of consumable materials to, for example, build molds of the reference denture that can be used to form a new but similar denture base. In some implementations, the process 2000 may reduce the time and materials required to fabricate a replacement denture while increasing the quality and match of the replacement denture to the reference denture.

Furthermore, it may be necessary or desirable to adjust the vertical dimension of occlusion of the patient and re-equilibrate the occlusion of the replacement denture. In these cases, the replacement denture will not necessarily exactly match the existing reference denture but will instead be based on and similar to the reference denture. The tooth setup and equilibration techniques described herein can simplify this process while improving the quality of the resulting tooth setup.

At operation 2002, a digital reference denture model of a reference denture is acquired. For example, digital scan data representing the reference denture may be acquired using the dental impression station 106. In some implementations, the digital scan data may be captured in the patient's mouth using an intraoral scanner. Additionally, the digital scan data may be captured using an external scanner such as a laser scanner, a structured light scanner, and MRI scanner, or a CT scanner. For example, the reference denture may be scanned in a patient's mouth using a CBCT scanner in a dental office. The reference denture may also be scanned using a CBCT scanner outside of a patient's mouth.

Depending on the technology used for capturing the digital reference denture model, compensation adjustments, such as offsets, to the raw scan/capture data of the model may be made to account for errors inherent in the capture process. In some implementations, a calibration part of known dimensions is captured simultaneously with the reference denture. The magnitude of adjustments may be determined based on comparing the dimensions of the calibration part to the known dimensions for the calibration part.

In some implementations, the digital reference denture model may include only the top (or exterior) surface of the reference denture (e.g., when the digital scan data is captured in a patient's mouth using only an intraoral scanner). In these cases, a separate scan of the patient's gum tissue may also be captured for later use in designing the bottom surface of the replacement dentures. Additionally, the bottom surface of the reference dentures (which is in contact with the patient's mouth when worn) may be scanned while the denture is not being worn. An intraoral scanner may be used outside of the patient's mouth to scan this surface. Additionally, any of the previously described scanning technologies may be used to scan this bottom surface.

At operation 2004, the digital reference denture model is positioned based on a specified vertical dimension of occlusion for the replacement denture. The vertical dimension of occlusion may be determined according to any of the techniques described elsewhere herein.

The vertical dimension of occlusion may be provided as a numeric value. In these examples, the dental arches of the digital reference denture model may be moved apart from one another to provide the desired vertical dimension of occlusion. In some implementations, the dental arches are moved apart from one another along a curved motion path representing the patient's actual jaw hinge motion. In some implementations, the dental arches are moved apart from one another along a curved motion path corresponding to a simulated motion based on a determined or inferred hinge location of the patient's jaw.

The vertical dimension of occlusion may also be provided through scan data, such as a scan of the existing reference denture with a bite record positioned between the dental arches to provide the desired vertical dimension of occlusion for the patient. In these examples, the digital reference denture model may include multiple models: such as a model of the lower dental arch of the reference denture, a model of the upper dental arch of the reference denture, and a model of both dental arches in the desired position relative to one another (i.e., with the desired vertical dimension of occlusion) or a model of a bite record that will fit to the occlusal surfaces of the reference dentures and defines a relationship between the upper and lower dental arches of the reference denture with the desired vertical dimension of occlusion. In these cases, the separate upper and lower dental arch models may be aligned to the combination model or the bite record model. In this way, the separate upper and lower dental arches (which may be higher quality or more easily separatable/segmentable) can be positioned to achieve the desired vertical dimension of occlusion.

It should be understood that when the upper and lower reference denture models are positioned to provide the specified vertical dimension of occlusion, the teeth of the upper and lower reference denture models may be out of occlusion (e.g., not in contact with each other). The positions of the denture teeth may be adjusted later in the process (e.g., during operation 2010, where the denture teeth are equilibrated) to remove the space between the teeth while maintaining the desired vertical dimension of occlusion.

At operation 2006, a denture tooth library is selected based on the digital reference denture model. In some implementations, a width is determined for one or more of the teeth in the reference denture models. For example, a width of the upper six anterior teeth of the digital reference denture model may be determined. The width may be an arch width (i.e., measured along the dental arch) or a mesiodistal width (measured along the mesiodistal dimension). A denture tooth library having a width that most closely matches the width determined for the digital reference denture model may be selected.

In some implementations, the portion corresponding to an anterior tooth is identified based on position and geometric features of the model. For example, an occlusal portion of the digital reference denture model may be identified based on the coordinates (e.g., the highest 5-25% of the model based on a vertical coordinate). A curve may be fit to that occlusal portion to generate an arch form corresponding to the arch form of the patient's dentition. A region adjacent to the midpoint of the arch form may be identified as corresponding to a central incisor. In some implementations, geometric features may be used to identify edges of teeth along the arch form. For example, the interfaces between adjacent teeth (interproximal regions) may be identified based on finding lower points in the identified occlusal portion. The identified portion may also be identified using any type of tooth segmentation technique, including fully and partially automatic segmentation techniques.

In some implementations, the portion identified as corresponding to an anterior tooth may be used to determine a width value for the digital reference denture model. Multiple anterior teeth (e.g., all six anterior teeth) may be identified and used to determine a width value for the digital reference denture model.

The selected denture tooth library may be displayed visually so that a user may confirm or reject the selection. In some implementations, several candidate denture tooth libraries (e.g., the three that have the closest width to that of the digital reference denture model) are selected and presented to a user. A user may use a user interface to select between these options.

Figure 21A:
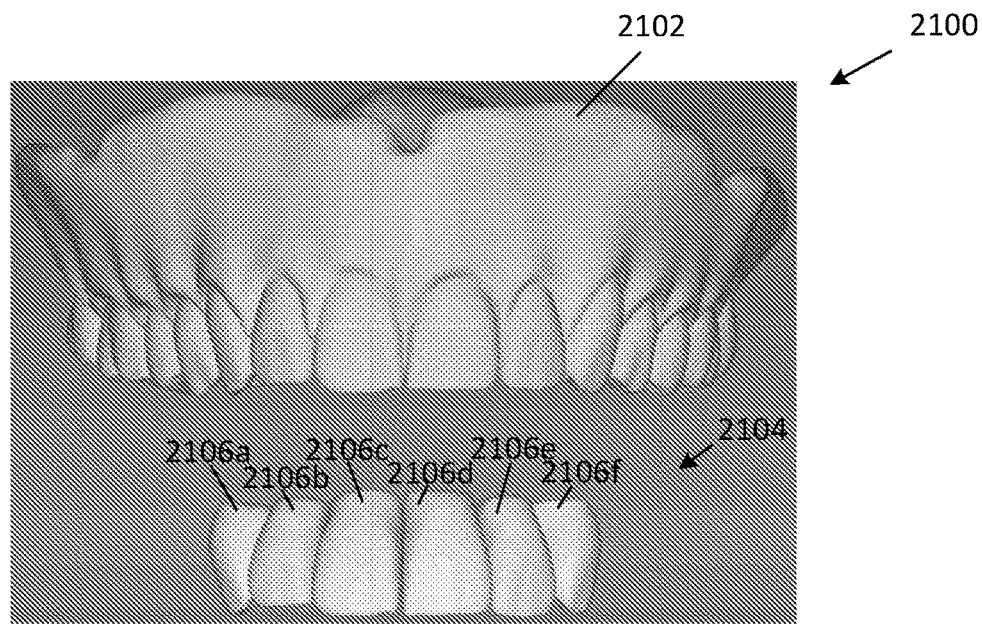
FIG. 21A is a schematic diagram of an example user interface according to embodiments described herein.

Turning now to FIG. 21A, an example user interface 2100 is shown. The user interface 2100 displays a digital reference denture model 2102 along with a portion 2104 of a selected denture tooth library. In this example, the portion 2104 includes denture tooth 2106a, denture tooth 2106b, denture tooth 2106c, denture tooth 2106d, denture tooth 2106e, and denture tooth 2106f. The portion 2104 may be displayed for a selected denture tooth library. A user may be able to review and approve the selection of the denture tooth library using a user-actuatable control (not shown) displayed on the user interface 2100. In some implementations, the user interface 2100 may include one or more additional user-actuatable controls to load or scroll through different denture tooth libraries.

Returning now to operation 2006 of FIG. 20, in some implementations, additional features of the digital reference denture model are used to select the denture tooth library. For example, a portion of the digital reference denture model may be identified and used to select a denture tooth library that is similar to that identified portion. For example, the portion may correspond to an anterior tooth, such as a central incisor. The portion may be identified based on user input (e.g., the user may touch or click on a point of the portion of the digital reference denture model that is being displayed, or the user may outline a portion of a tooth in the digital reference denture model). The portion may also be identified using any of the previously described techniques for identifying one or more teeth in the anterior region of the digital reference denture model.

Using the identified portion, models of the corresponding denture teeth from multiple libraries may be aligned to that portion. The denture teeth models may be aligned using, for example, an iterative alignment process, such as an iterative closest point alignment. Iterative closest point alignment may be performed by iteratively (e.g., repeatedly) associating selected points (e.g., vertices) from the denture tooth model with the closest points from the identified portion of the digital reference denture model, estimating a transformation (e.g., a rotation and translation) of the denture tooth model to more closely align the selected points from the denture tooth model to the associated closest points from the portion of the digital reference denture model, and applying the transformation to the denture tooth model. In some implementations, the selected points on the denture tooth model are on an anterior surface of the denture tooth model. The selected points may be identified in advance and stored with the denture tooth model (e.g., as labels associated with specific vertices).

The alignment process may continue for a specific number of iterations or until the transformation calculated/applied during an iteration is below a specific threshold. The aligned denture tooth may be compared to the portion of the denture scan to calculate a similarity value. In some implementations, portions of the denture tooth model are weighted differently when computing a similarity score. For example, the incisal edge may be assigned a lower weight than the labial surface. This weighting may compensate for the fact that the incisal edges of the teeth in the digital reference denture model are more likely to be damaged or worn down to long-term use.

Multiple denture tooth models from different libraries may be aligned and compared. The denture tooth library containing the most similar denture tooth model (e.g., based on the calculated similarity values) may be selected. In some implementations, denture tooth models from a subset of the different libraries are used. An initial filter (or selection) process may be used to reduce the number of different libraries that are considered. The initial filter process may be based on a width value of one or more anterior teeth. The initial filter process may be based on biographic information on the patient.

The initial filter process may also be based on extracting a shape from the selected portion of the digital reference denture model. For example, multiple horizontal slices of the portion may be generated (e.g., by computing the intersection of a horizontal plane with the portion) and compared to each other to determine a general shape of the tooth. For example, this process may determine that the portion of the digital reference denture model has teeth with a square, ovoid, or tapering shape. A subset of denture tooth libraries may then be identified based on the determined shape. This subset may be aligned and compared to the portion of the digital reference denture model to calculate a similarity value.

Figure 21B:
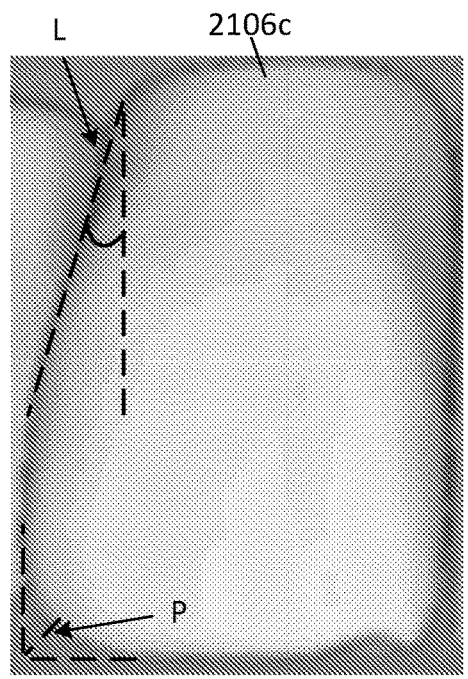
FIG. 21B is a schematic diagram of an example denture tooth.
Figure 21C:
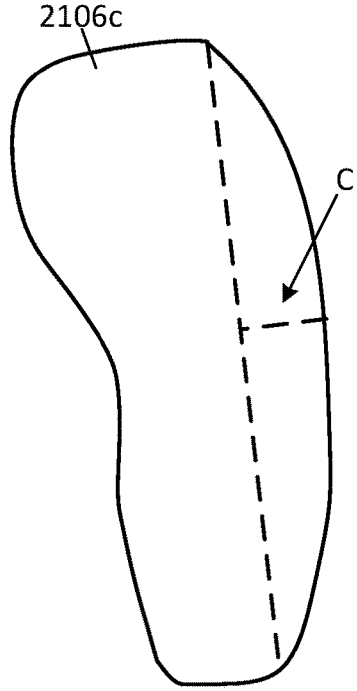
FIG. 21C is a schematic diagram of an example denture tooth.

The initial filter process may also be based on other properties of the reference denture model that are manually or automatically determined. For example, one or more of a point angle, line angle, or labial convexity value may be determined for an anterior tooth portion of the reference denture model. Turning now to FIGS. 21B and 21C, the denture tooth 2106c is shown with an indicator L of a line angle, an indicator P of a point angle, and indictor C of labial convexity. The indicator L of the line angle shows an angle value that may be determined for the library tooth by determining the angle of the distal edge of a tooth. The indicator P of the point angle shows a value that corresponds to the roundness of an incisal corner of the tooth. The indicator C shows a value that corresponds to the convexity of the labial surface of the tooth. In some implementations, more than one point angle, line angle, or labial convexity value is determined for the patient's dentition as the tooth may be asymmetric. These and other properties of a patient's teeth may be determined and used to guide the selection of a denture tooth library in at least some implementations.

When dentures for both the upper and lower dental arches are being produced, a single library of denture teeth may be selected and used for both the upper and lower dental arches in some implementations. In other implementations, separate libraries of denture teeth are selected for the upper dental arch and the lower dental arch. Further, different libraries or different variants of library teeth may be selected. For example, different libraries or variants within a library may be selected for antimeres so as to provide asymmetry that may create a more natural appearance for the denture.

Returning now to FIG. 20, at operation 2008, denture teeth from the identified denture tooth library are selected and aligned to the digital reference denture model. The teeth corresponding to the teeth in the reference denture are selected from the denture tooth library and aligned to the digital reference denture model. For example, the denture tooth models may be positioned one at a time. For example, a denture tooth for a central incisor may be positioned first. The denture tooth may be positioned and aligned to the digital reference denture model using alignment techniques similar to those described previously (e.g., iterative closest point). After the first denture tooth model is aligned to the digital reference denture model, an adjacent tooth may be positioned next to it. After the adjacent denture tooth model is initially positioned next to the aligned denture tooth model, the adjacent denture tooth model may then be aligned with the digital reference denture model (e.g., using an alignment technique such as iterative closest point). This process may continue to be performed, working from the anterior dentition back to the posterior dentition, one tooth at a time until all of the teeth have been aligned to the digital reference denture model.

In some implementations, differences between the aligned denture library teeth and the digital reference denture model are identified. This information may be conveyed to a user visually using, for example, a colormap. This information may be beneficial to identify wear patterns and areas of the denture library teeth that may need to be modified in the replacement denture.

At operation 2010, the positioned and aligned denture teeth are equilibrated with respect to the opposing dentition. The aligned denture teeth may be out of contact with each other because an increase in vertical dimension is desired. The denture teeth may be repositioned and equilibrated to close the space between the teeth so that the desired vertical dimension of occlusion will be maintained when the patient uses the dentures.

In some implementations, the denture teeth of the upper dental arch are aligned based on the lip position of the patient. The upper anterior denture teeth may be adjusted and repositioned prior to adjusting any of the other denture teeth. The remaining upper denture teeth may then be positioned with respect to the upper anterior denture teeth following the curve of Spee and the curve of Wilson (e.g., they may be moved down into contact with a curved surface defined by one or more of the position of the upper anterior denture teeth, the curve of Spee, and the curve of Wilson). The lower denture teeth may then be automatically positioned (setup) with respect to the upper teeth. For example, the lower denture teeth may then be moved upward until contact is made with the upper denture teeth that have already been positioned. Either or both of the upper and lower denture teeth may be tilted or repositioned slightly to achieve a more balanced and comfortable occlusion.

Once the denture library teeth have been aligned to the respective digital reference denture models, the aligned denture library teeth from each arch may be moved with respect to each other according to motion data for the patient. This motion data for the patient may be actual motion data for the patient or simulated or inferred motion data for the patient. The simulated or inferred motion data may be based on a hinge location that has been determined for the patient.

This movement may be used to identify any potential interferences that could occur during normal jaw motion for the patient. The denture teeth may be adjusted to remove or minimize these interferences. In some implementations, the aligned denture teeth can be adjusted and repositioned using any of the automatic or interactive tools described elsewhere herein.

At operation 2012, a denture base digital model is generated based on the aligned denture teeth. The denture base digital model may be formed by using Boolean operations to subtract the aligned digital denture teeth from the digital reference denture model. This process will generate a model similar to the gum tissue portion of the reference denture with sockets to receive the denture teeth. In some implementations, the denture teeth are expanded by a small amount before they are subtracted from the digital reference denture model to leave space for adhesive between the denture teeth and the interior of the sockets. The expansion may be accomplished using a scaling of the denture teeth or an offset of the surfaces of the denture teeth by a fixed amount such as 0.05 to millimeters.

A common angle of insertion may be determined for all of the denture teeth on a dental arch. Any undercuts in the sockets from that angle of insertion may be removed. Removal of the undercuts may be performed by subtracting, from the digital denture base, a shape (e.g., a cylinder) that extends from the bottom surface of the socket along the insertion angle. his undercut removal may allow the denture teeth to be fabricated as a single piece (e.g., using rapid manufacturing technology) and placed in the denture base.

At operation 2014, gum tissue regions of the denture base digital model are adjusted based on the positions of the denture teeth. In some implementations, each of the denture library teeth models include markers of various landmarks that are usable to adjust gum tissue of the denture base. These markers may be lines, polylines, splines, meshes, non-uniform rational B-splines (NURBS), or other geometric shapes. The markers may be on the surface of the library denture teeth or may be offset from the surface. These markers move with the library denture teeth as the library denture teeth are positioned by the preceding steps of this process. The outer surface (corresponding to the gum tissue) may be adjusted based on these markers as will be explained further below with respect to FIG. 22.

Figure 22:
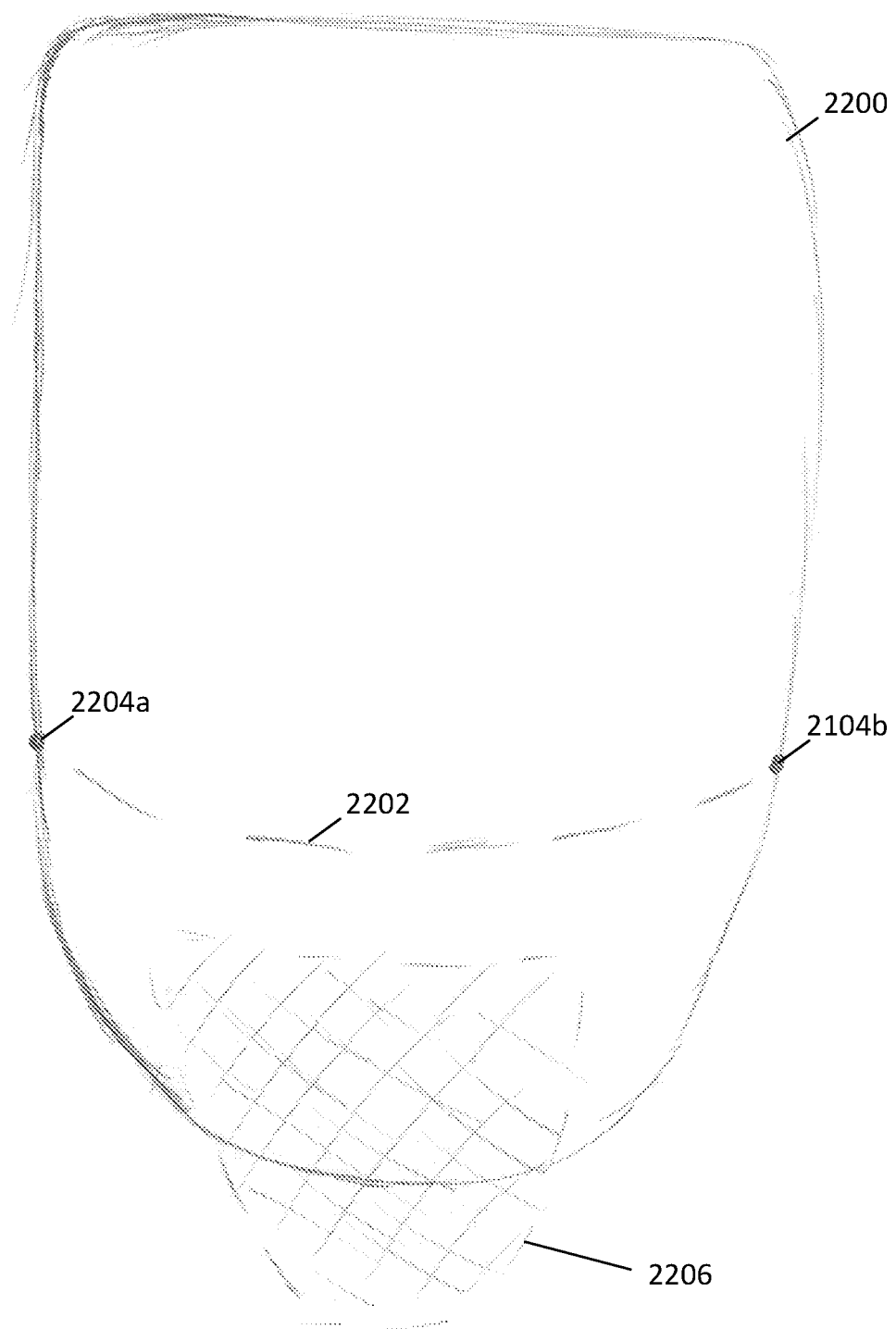
FIG. 22 is a schematic diagram of an example library denture tooth according to embodiments described herein.

Turning now to FIG. 22, a schematic diagram of an example library denture tooth 2200 is shown. The library denture tooth 2200 also includes several markers, including curve marker 2202, point markers 2204a and 2204b, and surface marker 2206. The curve marker 2202 and the point markers 2204a and 2204b may be positioned on the surface of the library denture tooth 2200. In this example, the surface marker 2206 is a surface that is positioned in relation to the library denture tooth 2200 but not on its surface. Some embodiments include additional or different markers that may be positioned differently.

Returning now to FIG. 20, during operation 2014, the gum tissue may be adjusted so that the top edge of the tooth socket of the denture based digital model follows the curve marker 2202, which corresponds to a target gingival margin for the library denture tooth 2200. The gum tissue region may be adjusted to form local maxima at or near the point markers 2204a and 2204b to represent interdental peaks. The gum tissue may also be adjusted to match (or approximately match) the shape of the surface marker 2206 so as to create an appearance of a root of the tooth within the denture base.

At operation 2016, a physical denture base is fabricated from the denture base digital model. The physical denture base may be fabricated using rapid fabrication technology. For example, a physical denture base may be fabricated with a 3D printer using a wax material that can be used to form a model for forming an acrylic denture base. In some implementations, the 3D printer prints the denture base directly using a biocompatible material that is safe to place in the patient's mouth. The actual physical denture teeth can then be placed and secured in the physical denture base. The denture teeth may also be produced as one or multiple parts using rapid manufacturing technology. In some implementations, a 3D printer may fabricate the denture teeth with the denture base.

In some implementations, prior to fabricating a denture, an image may be rendered of the denture. The image may be transmitted to a dental care provider for review. In some implementations, the denture may be rendered based on shade (color) information for the denture teeth specified by the dental care provider or determined from the reference denture. In some implementations, an image of a patient with the rendered denture teeth in place is generated. A user interface may be provided to allow the dental care provider to indicate on the image various changes or characterizations of the teeth that are desired.

This disclosure includes technology for generating denture setups (and other tooth setups). In some implementations, the setups are generated without using motion data. In some implementations, the setups may be generated using motion data. This motion data may be motion data corresponding to actual patient jaw motion as captured by the motion capture system. The motion data may also correspond to simulated motion based on typical jaw motion data. The motion data may also correspond to inferred motion that is determined based on a hinge location for the patient's jaw. For example, the hinge location for the patient's jaw may be determined using the motion capture system 200.

This disclosure also includes technology for generating a denture from a reference denture. In some implementations, generating a denture from a reference does not use any motion data. In some implementations, generating a denture from a reference denture uses motion data corresponding to actual jaw motion data for the patient. In some implementations, generating a denture from a reference denture uses simulated motion data based on typical jaw motion or inferred motion data based on a hinge location of a patient's jaw.

Figure 23:
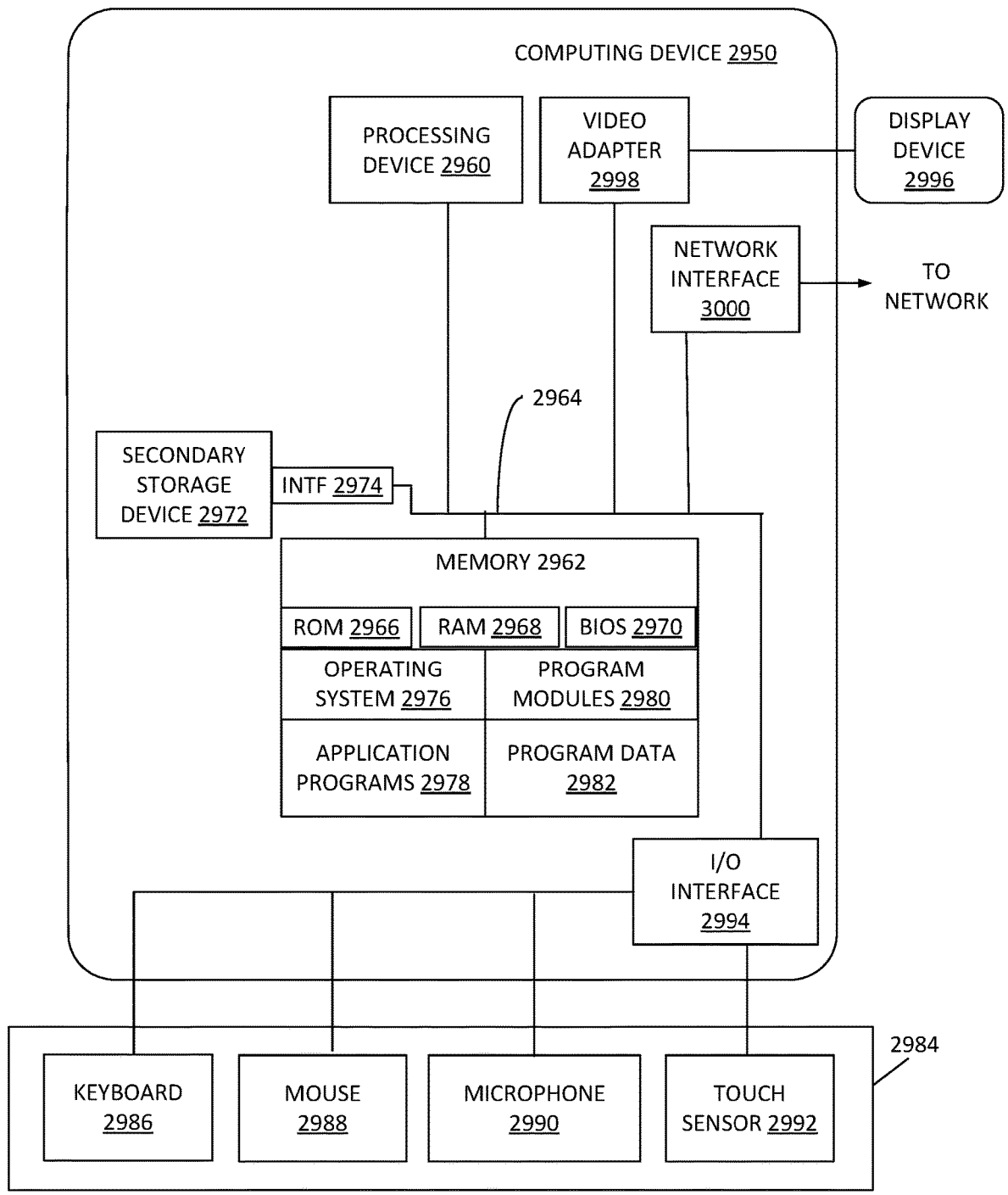
FIG. 23 illustrates an example architecture of a computing device, which can be used to implement aspects according to the present disclosure.

FIG. 23 illustrates an example architecture of a computing device 2950 that can be used to implement aspects of the present disclosure, including any of the plurality of computing devices described herein, such as a computing device of the denture design system 116, the motion determining device 206, or any other computing devices that may be utilized in the various possible embodiments.

The computing device illustrated in FIG. 23 can be used to execute the operating system, application programs, and software modules described herein.

The computing device 2950 includes, in some embodiments, at least one processing device 2960, such as a central processing unit (CPU). A variety of processing devices are available from a variety of manufacturers, for example, Intel or Advanced Micro Devices. In this example, the computing device 2950 also includes a system memory 2962, and a system bus 2964 that couples various system components including the system memory 2962 to the processing device 2960. The system bus 2964 is one of any number of types of bus structures including a memory bus, or memory controller; a peripheral bus; and a local bus using any of a variety of bus architectures.

Examples of computing devices suitable for the computing device 2950 include a desktop computer, a laptop computer, a tablet computer, a mobile computing device (such as a smartphone, an iPod® or iPad® mobile digital device, or other mobile devices), or other devices configured to process digital instructions.

The system memory 2962 includes read only memory 2966 and random-access memory 2968. A basic input/output system 2970 containing the basic routines that act to transfer information within computing device 2950, such as during start up, is typically stored in the read only memory 2966.

The computing device 2950 also includes a secondary storage device 2972 in some embodiments, such as a hard disk drive, for storing digital data. The secondary storage device 2972 is connected to the system bus 2964 by a secondary storage interface 2974. The secondary storage devices 2972 and their associated computer readable media provide nonvolatile storage of computer readable instructions (including application programs and program modules), data structures, and other data for the computing device 2950.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory computer-readable media. Additionally, such computer readable storage media can include local storage or cloud-based storage.

A number of program modules can be stored in secondary storage device 2972 or system memory 2962, including an operating system 2976, one or more application programs 2978, other program modules 2980 (such as the software engines described herein), and program data 2982. The computing device 2950 can utilize any suitable operating system, such as Microsoft Windows™, Google Chrome™ OS or Android, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 2950 through one or more input devices 2984. Examples of input devices 2984 include a keyboard 2986, mouse 2988, microphone 2990, and touch sensor 2992 (such as a touchpad or touch sensitive display). Other embodiments include other input devices 2984. The input devices are often connected to the processing device 2960 through an input/output interface 2994 that is coupled to the system bus 2964. These input devices 2984 can be connected by any number of input/output interfaces, such as a parallel port, serial port, game port, or a universal serial bus. Wireless communication between input devices and the interface 2994 is possible as well, and includes infrared, BLUETOOTH® wireless technology, 802.11a/b/g/n, cellular, ultra-wideband (UWB), ZigBee, or other radio frequency communication systems in some possible embodiments.

In this example embodiment, a display device 2996, such as a monitor, liquid crystal display device, projector, or touch sensitive display device, is also connected to the system bus 2964 via an interface, such as a video adapter 2998. In addition to the display device 2996, the computing device 2950 can include various other peripheral devices (not shown), such as speakers or a printer.

When used in a local area networking environment or a wide area networking environment (such as the Internet), the computing device 2950 is typically connected to the network through a network interface 3000, such as an Ethernet interface or WiFi interface. Other possible embodiments use other communication devices. For example, some embodiments of the computing device 2950 include a modem for communicating across the network.

The computing device 2950 typically includes at least some form of computer readable media. Computer readable media includes any available media that can be accessed by the computing device 2950. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 2950.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 23 is also an example of programmable electronics, which may include one or more such computing devices, and when multiple computing devices are included, such computing devices can be coupled together with a suitable data communication network so as to collectively perform the various functions, methods, or operations disclosed herein.

Example 1: A method comprising: acquiring a digital model of a patient's dentition; acquiring motion data for the patient; determining a vertical dimension of occlusion for the patient; positioning the digital model based on the motion data to achieve the desired vertical dimension; and generating a denture design based on the positioned digital model.

Example 2: The method of example 1, wherein the determining a vertical dimension of occlusion for the patient includes determining a total distance between edentulous ridges to accommodate dentures with a desired amount of occlusal open space when the patient is at rest.

Example 3: The method of example 1, wherein the determining a vertical dimension of occlusion for the patient includes receiving an input from a gothic arch tracer.

Example 4: The method of example 1, wherein the determining a vertical dimension of occlusion for the patient includes: acquiring an anterior facial image of the patient; aligning the anterior facial image to digital model; displaying the aligned anterior facial image; and receiving a user input to indicate the vertical dimension of occlusion based on the displayed anterior facial image.

Example 5: The method of example 4, wherein the aligning the anterior facial image to digital model of the patient includes scaling the anterior facial image.

Example 6: The method of any one of examples 4 and 5, wherein the displaying the aligned anterior facial image includes: generating a polygonal surface in a common coordinate system with the digital dental model; and displaying the anterior facial image on the polygon.

Example 7: The method of example 1, wherein the determining a vertical dimension of occlusion for the patient includes: receiving audio data that is mapped to the motion data; identifying a target portion of the audio; and identifying a position of a mandibular dental arch in the motion data based on the identified target portion of the audio.

Example 8: The method of example 7, wherein the identifying a target portion of the audio includes receiving a user input to identify the target portion.

Example 9: The method of example 7, wherein the identifying a target portion of the audio includes using sound processing to automatically identify the target portion of the audio.

Example 10: The method of any one of examples 1-9, wherein the positioning the digital model based on the motion data to achieve the desired vertical dimension includes rotating a mandibular dental arch of the digital dental model about a hinge axis determined from the motion data, to open to the determined vertical dimension of occlusion.

Example 11: The method of any one of examples 1-10, wherein the generating a denture design based on the positioned digital model includes: generating an occlusal guidance surface based on the determined vertical dimension of occlusion; positioning a first set of digital denture teeth models based on the occlusal guidance surface, the first set of digital denture teeth being for a first dental arch; and positioning a second set of digital denture teeth models based on the first set of digital denture teeth models, the second set of digital denture teeth being for a second dental arch.

Example 12: The method of example 11, wherein the generating a denture design based on the positioned digital model further includes generating a dental arch curve based on the digital model, and the positioning a first set of digital denture teeth models based on the occlusal guidance surface includes positioning the first set of digital denture teeth models based on the occlusal guidance surface and the arch curve.

Example 13: The method of any one of examples 11 and 12, wherein the positioning a second set of digital denture teeth models based on the first set of digital denture teeth models includes: positioning the second set of digital denture teeth models based on the arch curve; and moving the second set of digital denture teeth models into contact with the first set of digital denture teeth models.

Example 14: The method of example 13, wherein moving the second set of digital denture teeth models into contact with the first set of digital denture teeth models including moving the second set of digital denture teeth based on the motion data.

Example 15: The method of any one of examples 11 through 14, further comprising: generating a user interface that displays at least some of the first set of digital denture teeth and some of the second set of digital denture teeth; and receiving a user input; responsive to the user input: repositioning at least one tooth from the second set of digital denture teeth in a direction indicated by the user input; further repositioning the at least one tooth from the second set of digital denture teeth to make contact with the first set of digital denture teeth; and updating the display of the of the at least one tooth from the second set of digital denture teeth.

Example 16: The method of example 15, wherein the repositioning at least one tooth from the second set of digital denture teeth in a direction indicated by the user input includes repositioning the at least one tooth in a direction that is parallel to the occlusal guidance surface, and the further repositioning the at least one tooth from the second set of digital denture teeth to make contact with the first set of digital denture teeth includes repositioning the at least one tooth from the second set of digital denture teeth in a direction that is perpendicular to the occlusal guidance surface.

Example 17: The method of any one of examples 15 and 16, wherein the further repositioning the at least one tooth from the second set of digital denture teeth to make contact with the first set of digital denture teeth includes repositioning the at least one tooth based on the motion data.

Example 18: The method of any one of examples 15 through 17, wherein the at least one tooth from the second set of digital denture teeth includes a first tooth and a second tooth, the repositioning at least one tooth from the second set of digital denture teeth in a direction indicated by the user input includes repositioning the first tooth and the second tooth by a same movement, and the further repositioning the at least one tooth from the second set of digital denture teeth to make contact with the first set of digital denture teeth includes repositioning the first tooth and the second tooth by different movements.

Example 19: The method of any one of examples 11 through 18, wherein the generating a denture design based on the positioned digital model includes: generating a first digital denture base model based on the digital model of the patient's dentition and the first set of digital denture teeth.

Example 20: A method comprising: acquiring a digital model of a patient's dentition; positioning a first set of digital denture teeth models with respect to the digital model, the first set of digital denture teeth being for a first dental arch; positioning a second set of digital denture teeth models with respect to the digital model, the second set of digital denture teeth being for a second dental arch; generating a user interface that displays at least some of the first set of digital denture teeth and some of the second set of digital denture teeth; and receiving a user input; responsive to the user input: repositioning at least one tooth from the second set of digital denture teeth in a direction indicated by the user input; further repositioning the at least one tooth from the second set of digital denture teeth to make contact with the first set of digital denture teeth; and updating the display of the at the at least one tooth from the second set of digital denture teeth.

Example 21: A denture design system including at least one processor and at least one memory that is operably coupled to the at least one processor and storing instructions that, when executed by the at least one processor, cause the denture design system to perform the method of any one of examples 1 through 20.

Example 22: The system of example 21 further comprising a motion capture system that captures patient jaw motion and generates patient jaw motion data.

Example 23: A system comprising: a motion capture system that captures patient jaw motion and generates patient jaw motion data; and a denture design system including at least one processor and at least one memory that is operably coupled to the at least one processor and storing instructions that, when executed by the at least one processor, cause the denture design system to generate a denture design based on the patient jaw motion data by: generating an occlusal guidance surface based on the patient jaw motion data; and positioning digital denture library teeth based on the occlusal guidance surface.

Example 24: The system of example 23, wherein the generating an occlusal guidance surface based on the patient jaw motion data includes sweeping an opposing geometric structure based on the motion data.

Example 25: The system of example 24, wherein the sweeping the opposing geometric structure includes positioning the opposing geometric structure in a plurality of positions with respect to a dental arch based on the motion data.

Example 26: The system of example 25, further comprising joining the opposing geometric structure in the plurality of positions to form the occlusal guidance surface.

Example 27: The system of example 25, further comprising: generating an initial occlusal guidance structure; and deforming the initial occlusal guidance structure based on the opposing geometric structure in the plurality of positions to form the occlusal guidance surface.

Example 28: The system of any one of examples 24-27, wherein the opposing geometric structure is a surface representing the opposing dentition.

Example 29: The system of any one of examples 24-27, wherein the opposing geometric structure is a polyline generated from a cross-section of the opposing dentition.

Example 30: The system of any one of examples 24-27, wherein the opposing geometric structure is a midline polyline segment that extends in an anterior-posterior direction at a midline location.

Example 31: The system of any one of examples 24-27, wherein the opposing geometric structure includes at least one denture library tooth.

Example 32: A method comprising: acquiring a digital reference denture model of a reference denture for a patient; selecting a denture tooth library based on the digital reference denture model; selecting and aligning denture library teeth from the selected denture tooth library to the digital reference denture model; generating a denture base digital model based on the digital reference denture model and the aligned denture library teeth; and fabricating a physical denture based from the denture base digital model.

Example 33: The method of example 32, wherein the acquiring a digital reference denture model of a reference denture includes receiving digital scan data representing the reference denture.

Example 34: The method of example 33, wherein the receiving digital scan data representing the reference denture includes receiving cone beam computed tomography (CBCT) data of the reference denture in the patient's mouth.

Example 35: The method of any one of examples 32 through 34, further comprising acquiring digital scan data representing the patient's gum tissue and wherein the generating a denture base digital model based on the digital reference denture model and the aligned denture library teeth includes generating a denture base digital model based on the digital reference denture model, the aligned denture library teeth, and the digital scan data representing the patient's gum tissue.

Example 36: The method of any one of examples 32 through 34, further comprising positioning the digital reference denture model based on a specific vertical dimension of occlusion.

Example 37: The method of example 36, further comprising receiving a user input to specify the specific vertical dimension of occlusion.

Example 38: The method of example 36, further comprising: receiving additional scan data of the reference denture with a bite record positioned between the dental arches to provide the desired vertical dimension of occlusion for the patient; and determining the specific vertical dimension of occlusion based on the additional scan data.

Example 39: The method of any of examples 36 through 38, wherein the positioning the digital reference denture model based on a specific vertical dimension of occlusion includes moving a mandibular dental arch of the digital reference denture model and a maxillary dental arch of the digital reference denture model apart from one another along a curved motion path corresponding to a simulated motion based on a determined or inferred hinge location of the patient's jaw.

Example 40: The method of example 39, further comprising: acquiring motion data for the patient; and inferring a hinge location based on the motion data.

Example 41: The method of any of examples 36 through 38, further comprising: acquiring motion data for the patient; and wherein the positioning the digital reference denture model based on a specific vertical dimension of occlusion includes moving a mandibular dental arch of the digital reference denture model and a maxillary dental arch along a motion path determined from the motion data.

Example 42: The method of any one of examples 32 through 41, wherein the selecting a denture tooth library based on the digital reference denture model includes: determining a width of a portion of the digital reference denture model; and identifying the denture tooth library based on the determined width.

Example 43: The method of example 42, wherein the determining a width of a portion of the digital reference denture model includes determining the width of the upper six anterior teeth of the digital reference denture model.

Example 44: The method of any one of example 42 and 43, further comprising identifying a portion of the digital reference denture model based on position and geometric features.

Example 45: The method of any one of examples 42 through 44, further comprising segmenting the digital reference denture model.

Example 46: The method of any one of examples 32 through 45, wherein the selecting a denture tooth library based on the digital reference denture model includes: identifying a portion of the digital reference denture model; and determining similarity values for the portion based on the alignment of the portion with a plurality of denture tooth libraries; and selecting a denture tooth library based on the alignment score.

Example 47: The method of example 46 wherein the determining similarity values for the portion based on the alignment of the portion with a plurality of denture tooth libraries includes using an alignment technique to align the portion with each of the plurality of denture tooth libraries.

Example 48: The method of example 47, wherein the alignment technique includes iterative closest point alignment.

Example 49: The method of any one of examples 32 through 41, wherein the selecting a denture tooth library based on the digital reference denture model includes: generating a horizontal cross section of at least a portion of the digital reference denture model; and identifying the denture tooth library based on the horizontal cross section.

Example 50: The method of any one of examples 32 through 41, wherein the selecting a denture tooth library based on the digital reference denture model includes: determining a shape of a portion of the digital reference denture model; and identifying the denture tooth library based on the determined shape.

Example 51: The method of any one of examples 32 through 50, wherein the selecting a denture tooth library based on the digital reference denture model includes: causing a plurality of candidate denture tooth libraries to be displayed; and receiving a user input to select a denture tooth library from the plurality of candidate denture tooth libraries.

Example 52: The method of any one of examples 32 through 51, wherein the selecting and aligning denture library teeth from the selected denture tooth library to the digital reference denture model includes aligning denture library teeth to the digital reference denture model using an alignment technique.

Example 53: The method of example 52, wherein the alignment technique includes iterative closest point alignment.

Example 54: The method of any one of examples 32 through 53, further comprising equilibrating the aligned denture teeth with respect to opposing aligned denture teeth.

Example 55: The method of example 54, wherein the equilibrating the aligned denture teeth with respect to opposing aligned denture teeth includes equilibrating the aligned denture teeth using motion data.

Example 56: The method of any one of examples 32 through 55, wherein the generating a denture base digital model based on the digital reference denture model and the aligned denture library teeth includes using Boolean operations to subtract aligned denture library teeth from the reference denture model.

Example 57: The method of any one of examples 32 through 56, wherein the generating a denture base digital model based on the digital reference denture model and the aligned denture library teeth includes determining a common angle of insertion for the aligned denture library teeth; and removing undercuts in socket portions of the denture base digital model with respect to the common angle of insertion.

Example 58: The method of any one of examples 32 through 57, further comprising: adjusting a gum tissue region of the denture base digital model based on landmarks associated with the aligned denture library teeth.

Example 59: A denture design system including at least one processor and at least one memory that is operably coupled to the at least one processor and storing instructions that, when executed by the at least one processor, cause the denture design system to perform the method of any one of examples 32 through 58.

Example 60: The system of example 59 further comprising a motion capture system that captures patient jaw motion and generates patient jaw motion data.

Example 61: A non-transitory computer-readable storage medium comprising instructions stored thereon that, when executed by at least one processor, are configured to cause a computing system to perform the method of any one of examples 1 through 20 and 32 through 58.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method performed by a computer system comprising memory and one or more processors, the method comprising:

acquiring a three dimensional (3D) digital model of a patient's dentition, wherein the 3D digital model is represented in a 3D digital coordinate system;

acquiring motion data for the patient, wherein the motion data is represented in the 3D digital coordinate system;

determining a vertical dimension of occlusion in the 3D digital coordinate system for the patient, wherein the vertical dimension of occlusion comprises a distance between corresponding dental features on opposing dental arches when the patient is at rest;

positioning the 3D digital model in the 3D digital coordinate system based on the motion data to achieve the desired vertical dimension; and generating a 3D digital denture design based on the positioned 3D digital model.

2. The method of claim 1, wherein the corresponding dental features comprise edentulous ridges on the opposing dental arches, and the vertical dimension comprises a total distance between the edentulous ridges to accommodate dentures with a desired amount of occlusal open space when the patient is at rest.

3. The method of claim 1, wherein the determining a vertical dimension of occlusion for the patient includes receiving an input from a gothic arch tracer.

4. The method of claim 1, wherein the determining a vertical dimension of occlusion for the patient includes:
acquiring a digital anterior facial image of the patient;
aligning the digital anterior facial image to the 3D digital model in the 3D digital coordinate system;
displaying the aligned anterior facial image in the 3D digital coordinate system; and
receiving a user input to indicate the vertical dimension of occlusion in the 3D digital coordinate system based on the displayed anterior facial image.

5. The method of claim 4, wherein the aligning the digital anterior facial image to the 3D digital model of the patient includes scaling the digital anterior facial image in the 3D digital coordinate system.

6. The method of claim 4, wherein the displaying the aligned anterior facial image includes:
generating a polygonal surface in the 3D digital coordinate system with the 3D digital model; and
displaying the digital anterior facial image on the polygon in the 3D digital coordinate system.

7. The method of claim 1, wherein the determining a vertical dimension of occlusion for the patient includes:
receiving audio data that is mapped to the motion data;
identifying a target portion of the audio; and
identifying a position of a mandibular dental arch in the motion data based on the identified target portion of the audio.

8. The method of claim 7, wherein the identifying a target portion of the audio includes receiving a user input to identify the target portion.

9. The method of claim 7, wherein the identifying a target portion of the audio includes using sound processing to automatically identify the target portion of the audio.

10. The method of claim 1, wherein the motion data comprises simulated motion data for the patient.

11. The method of claim 1, wherein the motion data comprises inferred motion data for the patient.

12. The method of claim 1, wherein the motion data comprises actual motion data captured from the patient.

13. A system comprising:
a motion capture system that is configured to capture patient jaw motion and generates patient jaw motion data; and
a denture design system including at least one processor and at least one memory that is operably coupled to the at least one processor and storing instructions that, when executed by the at least one processor, cause the denture design system to generate a three-dimensional (3D) digital denture design based on the patient jaw motion data by:
generating an occlusal guidance surface in a 3D digital coordinate system based on the patient jaw motion data represented in the 3D digital coordinate system, wherein the generating an occlusal guidance surface based on the patient jaw motion data includes sweeping an opposing geometric structure in the 3D digital coordinate system based on the motion data; and
positioning 3D digital denture library teeth in the 3D digital coordinate system based on the occlusal guidance surface.

14. The system of claim 13, wherein the sweeping the opposing geometric structure includes positioning the opposing geometric structure in a plurality of positions in the 3D digital coordinate system with respect to a dental arch based on the motion data.

15. The system of claim 14, further comprising joining the opposing geometric structure in the plurality of positions to form the occlusal guidance surface.

16. The system of claim 14, further comprising:
generating an initial occlusal guidance structure in the 3D digital coordinate system; and
deforming the initial occlusal guidance structure in the 3D digital coordinate system based on the opposing geometric structure in the plurality of positions to form the occlusal guidance surface in the 3D digital coordinate system.

17. The system of claim 13, wherein the opposing geometric structure is a surface in the 3D digital coordinate system representing the opposing dentition.

18. The system of claim 13, wherein the opposing geometric structure is a polyline in the 3D digital coordinate system generated from a cross-section of the opposing dentition.

19. The system of claim 13, wherein the opposing geometric structure is a midline polyline segment in the 3D digital coordinate system that extends in an anterior-posterior direction at a midline location.

20. The system of claim 13, wherein the opposing geometric structure includes at least one denture library tooth.

* * * * *